United States Patent [19]
Hiratsuka et al.

[11] Patent Number: 5,953,443
[45] Date of Patent: Sep. 14, 1999

[54] STRIPE PATTERN MATCHING SYSTEM

[75] Inventors: Seiichi Hiratsuka; Yukio Hoshino; Junichi Kunikata; Yoshihide Takahashi, all of Tokyo, Japan

[73] Assignee: NEC Corporation, Tokyo, Japan

[21] Appl. No.: 09/030,814

[22] Filed: Feb. 26, 1998

[30] Foreign Application Priority Data

Feb. 27, 1997 [JP] Japan .................................. 9-044043

[51] Int. Cl.⁶ .................................................. G06K 9/00
[52] U.S. Cl. ...................... 382/125; 382/126; 340/825.34
[58] Field of Search .................................. 382/125, 124, 382/126, 127, 115, 294; 356/71; 340/825.34

[56] References Cited

U.S. PATENT DOCUMENTS

| | | | |
|---|---|---|---|
| 4,646,352 | 2/1987 | Asai et al. | 382/125 |
| 4,944,021 | 7/1990 | Hoshino et al. | 382/125 |
| 4,956,870 | 9/1990 | Hara | 382/124 |
| 5,040,224 | 8/1991 | Hara | 382/124 |

FOREIGN PATENT DOCUMENTS

| | | |
|---|---|---|
| 06-12674 | 4/1985 | Japan . |
| 63-21233 | 5/1988 | Japan . |
| 2-183380 | 7/1990 | Japan . |

Primary Examiner—Joseph Mancuso
Assistant Examiner—Vikkram Bali
Attorney, Agent, or Firm—Sughrue, Mion, Zinn, Macpeak & Seas, PLLC

[57] ABSTRACT

To provide a stripe pattern matching system enabling to verify minutia correspondence between a searching stripe pattern and a filed stripe pattern independent of position or direction of the searching stripe pattern, correspondence value between them is evaluated by comparing their distances, directions or relations to their each neighboring minutiae by a pairing examination means (16). The most appropriate rotation angle and the most appropriate shifting coordinates for adjusting the searching stripe pattern to the filed stripe pattern is obtained by selecting a most appropriate axial candidate giving the most concentrated coordinate deviations referring to deviation distributions of correspondence values accumulated on a deviation plane memory (18) by applying each axial candidate as the coordinate adjustment reference. Therefore, the most appropriate coordinate adjustment can be performed even when either or both of absolute direction and position cannot be specified, in the invention.

10 Claims, 16 Drawing Sheets

STRIPE PATTERN MATCHING SYSTEM

BACKGROUND OF THE INVENTION

The present invention relates to a stripe pattern matching system for verifying matching of a searching stripe pattern such as a fingerprint gathered from a field to a filed stripe pattern already registered in a file.

FIG. 2 is a pattern diagram illustrating minutiae of a fingerprint pattern by way of example of the stripe pattern.

A method for identifying a stripe pattern such as a fingerprint pattern is disclosed in a Japanese patent published with a specification No. 12674/'85, wherein end points such as those 2a to 2e of ridge lines 1a to 1e and bifucations such as a joining point 3a of two ridge lines 1f and 1g of FIG. 2 are defined as the minutiae to be used for the matching verification.

For each minutia, a direction and four relations are defined in addition to its X-Y coordinates.

First, direction $D_i$ of a minutia, the end point 2a of FIG. 2, for example, is defined as the orientation of the ridge line 1a starting from the concerning minutia 2a expressed relatively to horizontal X-axis. In case of a bifucation, the joining point 3a, for example, its direction is represented by the orientation of a valley line between joining two ridge lines 1f and 1g.

Then, talking notice of each individual minutia, the end point 2a, for example, as a mother minutia, all x-y plane is defined, which has its origin at the mother minutia 2a and its y-axis in the direction $D_i$ of the mother minutia. In each of four quadrants determined by the x-y plane, a minutia nearest to the origin, that is the mother minutia, is assigned to a child minutia in the quadrant, and numbers of ridge lines between the mother minutia 2a and the four child minutiae 2b, 2c, 3a and 2d are defined as four relations R1 to R4, respectively. In the example, the relation R1 of the minutia 2a is two, as there are two ridge lines, 1b and an extension of 1a, between the two end points 2a and 2b. In the same way, R2=1, R3=2 and R4=1. When there is an obscure part between a mother minutia and a child minutia, concerning relation Ri is represented as Ri=x.

Thus, a stripe pattern is represented by a list of minutiae, in the prior art.

In another Japanese patent published with a specification No. 21233/'88, there is disclosed a stripe pattern matching system making use of the minutia list for verifying matching of a searching stripe pattern to a filed stripe pattern.

As for matching of the stripe pattern such as the fingerprint, there are two ways of verification. One is a way applied for identifying an unknown searching finger print gathered from a field, by verifying its matching to one of a plurality of filed fingerprints already registered, such as performed for criminal investigation, and the other is a way applied for confirming an individual by verifying matching of his fingerprint input together with his ID number to a specific fingerprint registered accompanied by the ID number, such as applied to gate control.

FIG. 14 is a flowchart illustrating all example of the former way, and FIG. 15 is that of the latter way.

In the way of FIG. 14, after an area pattern and a minutia list of a searching stripe pattern are input (at step 47), those of a filed stripe pattern are input (at step 48). Then (at step 49), correspondence of each minutia registered in the minutia list of the searching stripe pattern is checked to each minutia registered in the minutia list of the filed stripe pattern by comparing their coordinates, directions and relations, for listing up pairs of minutiae, which are possibly corresponding to each other, into a candidate pair list as candidate pairs. Here, more than one candidate pair may be listed for one minutia of the searching stripe pattern. Then, coordinate adjustment values, that is, deviations of X-Y coordinates and direction between two corresponding minutiae are calculated for every candidate pair (at step 50) referring to the candidate pair list for checking distribution of the deviations. Processes performed at steps 49 and 50 are called the rough matching 61.

When significant coordinate adjustment values are found (at step 51) in distribution of the deviations, coordinates of minutiae of the searching stripe pattern listed in the candidate pair list are adjusted (at step 52) according to the significant coordinate adjustment values. Then (at step 53), each candidate pair is verified and selected by comparing coordinates and direction of the searching stripe pattern minutia after the coordinate adjustment with those of the filed stripe pattern. Then, correspondence value of each candidate pair after the selection is revised referring to correspondence between corresponding child minutiae of the paired minutiae (at step 54), considering the fact that when a pair of two mother minutiae have correspondence, each four pair of their child minutiae should have correspondence too.

Then (at step 55), a pair list of pairs, each composed of a minutia $S_i$ of the searching stripe pattern and its corresponding minutia $F_j$, when there is, in the filed stripe pattern, is extracted from the candidate pair list referring to correspondence value thus revised, as follows. Among the candidate pairs, a pair having a maximum correspondence value is selected and listed in the pair list, and candidate pairs left in the candidate pair list and having either minutia of the pair listed in the pair list are rejected as false pairs. Then, a candidate pair having maximum correspondence value among the candidate pairs left in the revised candidate pair list is selected and listed in the pair list as a next pair. By repeating the above selection until all candidate pairs are extracted or rejected from the candidate pair list, the pair list is prepared, wherein a specific minutia of the searching stripe pattern or the filed stripe pattern is listed in only one pair in the pair list, and some minutiae are left unpaired.

Then (at step 56), correspondence value of each pair is again revised referring to corresponding values between corresponding child minutiae of the paired minutiae in a similar way with step 54, and the unpaired minutiae are checked whether it is significant or not by checking if their partner minutiae are to be found in ineffective pattern area or not, or if they are one of opposing minutiae or not. After thus revising the correspondence values, a matching value is calculated (at step 57) by normalizing sum of the correspondence values by number of effective minutiae.

When no significant coordinate adjustment value is found at step 51, control goes directly to step 57 attributing the matching value of zero to the concerning filed stripe pattern.

The processes performed from step 51 to step 57 are called a detailed matching 62.

Thus repeating the rough matching 61 and the detailed matching 62 from step 48 to 57 for every filed stripe pattern, an ID number of a filed stripe pattern giving a largest matching value is output (at step 58) at the end of the matching verification of FIG. 14.

In FIG. 15, on the other hand, wherein identification of a searching stripe pattern is confirmed, an ID number of a specific filed stripe pattern is input for the first (at step 59). Then, the same procedure with FIG. 14 from step 47 to step 57 is performed only once for the filed stripe pattern specified by the ID number. When the matching value obtained at step 57 is larger than a fixed level, the ID number is confirmed at step 60.

FIG. 16 is a flowchart illustrating processes performed in a criminal investigation for searching a filed stripe pattern having a set of minutiae $\{F_j\}$ (j=1, 2, ... ) most similar to a set of minutiae $\{S_i\}$ (i=1, 2, ... ) of a searching stripe pattern among a plurality of filed stripe patterns, that is, detailed processes of the way described in connection with FIG. 14.

Initializing both of a maximum matching value MSC and an ID number N of a most matching filed stripe pattern to zero, a set of minutiae $\{S_i\}$ is extracted from a searching stripe pattern S at step 71. Then, a set of minutia $\{F_j\}$ and an ID number n of a filed stripe pattern are read out at step 72. When there is no filed stripe pattern to be read out, control goes to step 85, and otherwise, control goes to step 73.

At step 73, each minutia $F_{il}$ (il∈j) of the filed stripe pattern having coordinates, direction and relations whereof differences are all within respective threshold values from those of a minutia $S_i$ of the searching stripe pattern is registered in the candidate pair list as a partner of the minutia $S_i$ of each of candidate pairs $\{S_i: F_{il}/v_{il}\}$ together with their correspondence value $v_{il}$, which is performed for each minutia $S_i$ of the set of minutiae $\{S_i\}$.

Thus, following candidate pairs are listed in the candidate pair list.

$S_1: F_{11}/v_{11}, S_1: F_{12}/v_{12}, \ldots,$ $S_i: F_{i1}/v_{i1}, S_i: F_{i2}/v_{12}, \ldots,$ $S_m: F_{m1}/v_{m1}, S_m: F_{m2}/v_{12}, \ldots,$ Then, a maximum concentration M, a most appropriate rotation angle R and most appropriate shifting coordinates ($\Delta X$, $\Delta Y$) are initialized to zero.

Then, a rotation angle r is initialized to −29.4°, for example, at step 74 and it is incremented by 1.4° at step 75.

At step 76, X-Y coordinates and direction ($X_i$, $Y_i$, $D_i$) of each minutia $S_i$ are rotated with the rotation angle r in relation to origin of the X-Y plane, for example, into rotated values ($X_i^r$, $Y_i^r$, $D_i^r$) as follows:

$X_i^r = X_i \cos r + Y_i \sin r$, $Y_i^r = Y_i \cos r + X_i \sin r$, $D_i^r = D_i + r$.

Then, calculating deviations ($\Delta X_i$, $\Delta Y_i$, $\Delta D_i$) of rotated minutia $S_i^r$ from its partner minutia $F_{il}$ having coordinates and direction ($X_{il}$, $Y_{il}$, $D_{il}$) as follows:

$\Delta X_i = X_i - X_{il}$, $\Delta Y_i = Y_i - Y_{il}$, $\Delta D_i = D_i - D_{il}$;

correspondence value $v_{il}$ of each candidate pair is accumulated on a discrete $\Delta X$-$\Delta Y$ deviation plane, when direction deviation $\Delta D_i$ is within a threshold value TD.

After all correspondence values $\{v_{il}\}$ are accumulated on corresponding coordinates of the discrete $\Delta X$-$\Delta Y$ deviation plane, concentrated deviation coordinates ($\Delta X'$, $\Delta Y'$) having a largest accumulation M' of the correspondence values $\{v_{il}\}$ are obtained for the concerning rotation angle r, and, at step 77, the maximum concentration M, the most appropriate rotation angle R and the most appropriate shifting coordinates ($\Delta X$, $\Delta Y$) are replaced with the largest accumulation M', the concerning rotation angle r and the concentrated deviation coordinates ($\Delta X'$, $\Delta Y'$), respectively, when the largest accumulation M' is larger than the maximum concentration M.

Then, at step 78, it is checked whether the rotation angle r is smaller than 28.0°, for example, and steps 75 to 78 are repeated by incrementing the rotation angle r with 1.4° until it attains to 28.0°.

Thus, the maximum concentration M, the most appropriate rotation angle R and the most appropriate shifting coordinates ($\Delta X$, $\Delta Y$) of the searching stripe pattern are obtained for a concerning filed stripe pattern.

When the maximum concentration M is found smaller than a fixed value at step 79, matching value SC of the concerning filed stripe pattern is set to zero (at step 80) considering there is no significant correspondence thereto, and the control returns to step 72 for verifying correspondence to a next filed stripe pattern.

When the maximum concentration M is larger than the fixed value, the control goes to step 81 for performing the detailed matching.

At step 81, coordinates and direction of every of the set of minutiae $\{S_i\}$ are adjusted by applying the most appropriate rotation angle R and the most appropriate shifting coordinates ($\Delta X$, $\Delta Y$) as the adjustment values into a set of adjusted minutiae $\{\overline{S}_i\}$.

At step 82, candidate pairs $\{\overline{S}_i: F_{il}/vil\}$ are calculated in the same way as performed at step 73 making use of the set of adjusted minutiae $\{\overline{S}_i\}$ instead of the original set of minutiae $\{S_i\}$. Then at step 83, a pair list is extracted by rejecting duplicated candidate pairs, each correspondence value of the listed pair is reinforced or omitted, and a normalized sum of the correspondence values is calculated as the matching value SC of the searching stripe pattern to the concerning filed stripe pattern, as described previously in connection with respective steps 54, 55, 56 and 57 of FIG. 14.

When the matching value SC is larger than the maximum matchimg value MSC, the maximum matching value MSC is substituted with the matching value SC and the ID number n of the concerning filed stripe pattern is assigned to the ID number N of the most matching filed stripe pattern at step 84.

Then, the control is returned to step 72, for repeating processes from step 72 to step 84 until there is found no filed stripe pattern to be read out.

Finally at step 85, the maximum matching value MSC thus revised is compared with a threshold value. When the maximum matching value MSC is larger than the threshold value, the ID number N is output as the ID number of the most matching filed stripe pattern, and otherwise, it is reported that there is found no filed stripe pattern matching to the searching stripe pattern S.

As above described, matching procedure disclosed in the Japanese patent of the specification No. 21233/'88 is performed on an assumption that the set of minutiae $\{S_i\}$ or $\{F_j\}$ of the searching or the filed fingerprint, when it is the case, is represented by coordinates and direction relative to the X-Y plane which have origin approximately at the core of the fingerprint and Y-axis approximately oriented to the fingertip. Based on the assumption, candidate pairs are sought at step 73 of FIG. 16, and at steps 74 to 78, coordinates adjustment is performed referring to correspondence between paired minutiae. Therefore, pairing at step 73 plays an important role, and once minutiae are paired inadequately because of low quality of a partly gathered fingerprint or lack of core of a fingerprint in the cases such as a plain arch pattern, it is very difficult to adjust their coordinates, needing to reset again the origin and the direction, or needing to prepare several different coordinate planes for the correct matching.

This is a problem of the prior art.

In a Japanese patent application laid open as a Provisional Publication No. 183380/'90, a personal ID verification system to be applied to gate control, for example, is disclosed. In the personal ID verification system, anl input fingerprint image is processed into binary image data and directional distributions of ridge lines are extracted and checked making use of mask patterns each having straight stripes ranged in different direction. Therefore, if the input fingerprint image is taken with a different position or different direction from those applied when the filed fingerprint is registered, the correct matching becomes difficult, which is usual in the case of a searching fingerprint gathered from a criminal field.

There is another stripe pattern matching method disclosed in a Japanese patent application laid open as a Provisional Publication No. 144982/'84. In this prior art, coincidence of ridge lines between a searching stripe pattern input through an image sensor and a filed stripe pattern is verified instead of matching of minutiae between the two stripe patterns. Therefore, correct matching cannot be obtained also in this prior art, when position or direction of the input searching stripe pattern differs from that of the filed stripe pattern. In this Provisional Publication, another method similar to the personal ID verification system of the Provisional Publication No. 183380/'90 is also proposed, wherein minutiae are extracted to be verified each time from the input searching stripe pattern referring to minutiae of the filed stripe pattern for confirming matching of the two stripe patterns. However, this method becomes also ineffective when position or direction of the input searching stripe pattern differs from that of the filed stripe pattern.

Furthermore, above two methods are, in practice, impossible to be applied to a fingerprint matching system used for criminal investigation, wherein filed fingerprints of more than 100 thousand persons are registered, for example. When 12 minutiae are to be checked for a fingerprint (it is said that two fingerprints can be regarded as those obtained from the same finger when 12 pairs of minutiae coincide between the two fingerprints.), and fingerprints of ten fingers are registered for a person, matching with more than a million filed fingerprints should be performed. It means that more than 12×1,000,000 minutiae must be extracted, which is extremely inefficient in practice.

SUMMARY OF THE INVENTION

Therefore, a primary object of the present invention is to provide a stripe pattern matching system to be used for specifying a searching stripe pattern such as a fingerprint gathered from a criminal field among a enormous number of filed stripe patterns with a high speed and a high precision as well, by enabling to verify minutia correspondence between a searching stripe pattern and a filed stripe pattern independent of position or direction of the searching stripe pattern.

In order to achieve the object, a stripe pattern matching system of the invention, for verifying matching of a searching stripe pattern to a filed stripe pattern of a plurality of filed stripe patterns beforehand registered, comprises:

a feature extraction means for extracting features of minutiae from the searching stripe pattern;

a searching stripe pattern feature memory for storing the features extracted by the feature extraction means;

a filed stripe pattern feature memory wherein prepared features of minutiae of the plurality of filed stripe patterns;

a pairing examination means for evaluating a correspondence value between a minutia of the searching stripe pattern stored in the searching stripe pattern feature memory and a minutia of the filed stripe pattern prepared in the filed stripe pattern feature memory;

a candidate pair list wherein candidate pairs are registered, each of said candidate pairs being a pair of a minutia of the searching stripe pattern and a minutia of the filed stripe pattern which are decided to be similar with each other by the pairing examination means evaluating the correspondence value between them;

a coordinate conversion means for calculating rotated coordinates of each of minutiae of the searching stripe pattern by rotating coordinates of said each of minutiae by a rotation angle designated around a designated point of an X-Y plane wherewith the coordinates of said each of minutiae are defined;

a rotated stripe pattern feature memory for storing the rotated coordinates of each of minutiae of the searching stripe pattern calculated by the coordinate conversion means to be accessed with each value of the rotation angle;

a deviation plane memory for accumulating the correspondence value of each of the candidate pairs satisfying a nomination condition at an address thereof indicated by deviation coordinates of said each of the candidate pairs, the deviation coordinates being differences between the rotated coordinates of a minutia of the searching stripe pattern and coordinates of a minutia of the filed stripe pattern of said each of the candidate pairs; and a control means for, selecting axial candidates among the candidate pairs, obtaining concentrated deviation coordinates giving a largest accumulation of the correspondence value for each of the axial candidates by controlling the deviation plane memory to accumulate the correspondence value of each of the candidate pairs satisfying the nomination condition according to the deviation coordinates obtained from the rotated coordinates calculated by the coordinate conversion means with the rotation angle equivalent to a direction difference between two minutiae of said each of the axial candidates, finding a most appropriate axial candidate which gives a maximum value of the largest accumulation among the axial candidates, determining the direction difference and the concentrated deviation coordinates given by the most appropriate axial candidate as a most appropriate rotation angle and most appropriate shifting coordinates of the searching stripe pattern, respectively, and performing a detailed matching of the searching stripe pattern to the filed stripe pattern making use of the most appropriate rotation angle and the most appropriate shifting coordinates.

Therefore, even when either or both of absolute direction and position, such as orientation of the fingertip and the core position of the fingerprint, cannot be specified, candidate pairs can be listed by selecting possibly corresponding two minutiae without needing to estimate the direction and the position of the searching stripe pattern, and the most appropriate coordinate adjustment of the searching stripe pattern can be performed without needing any troublesome manual works of the expert for correctly positioning and directioning the searching stripe pattern.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 2:
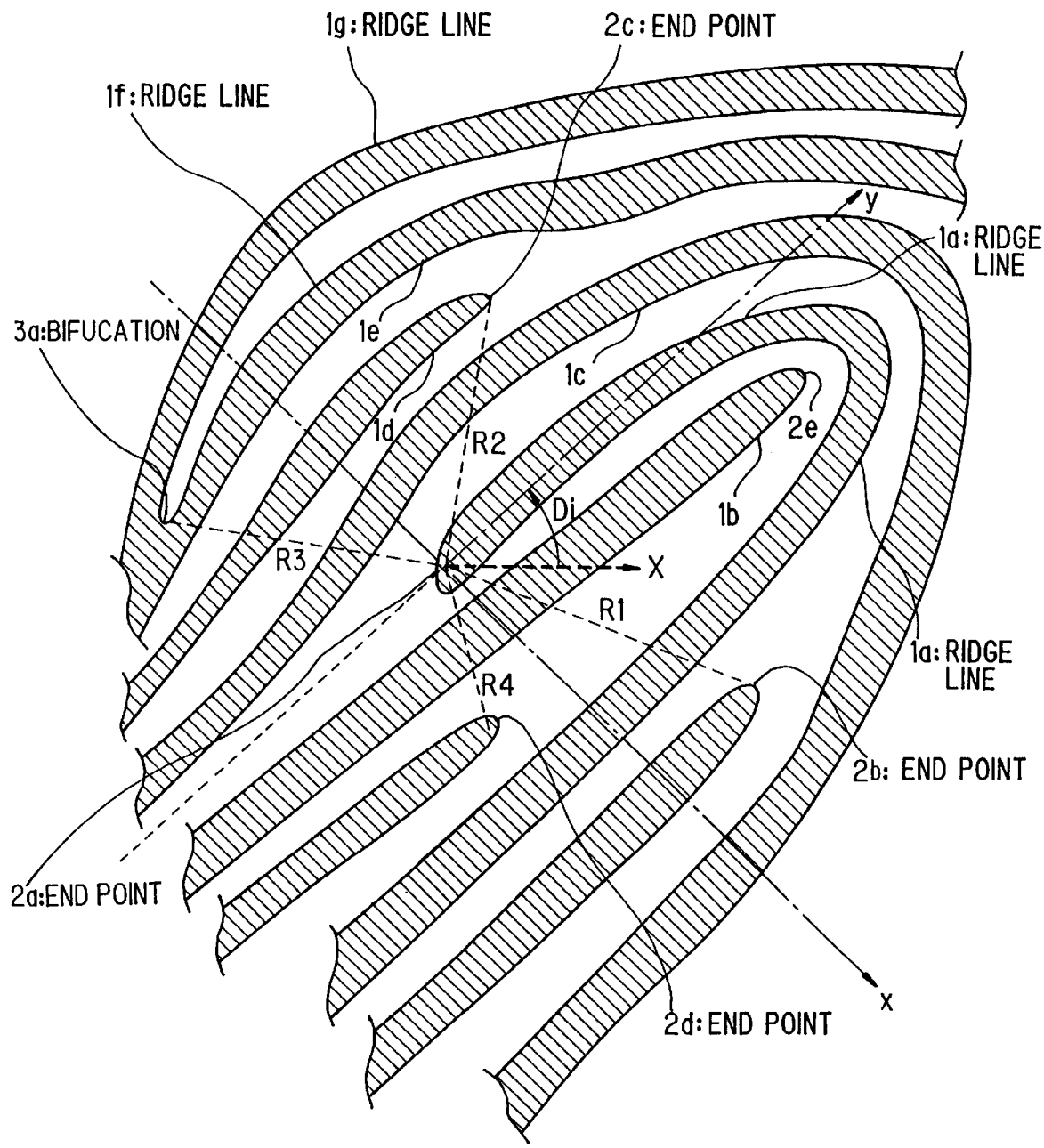
FIG. 2 is a pattern diagram illustrating minutiae of a fingerprint pattern by way of example of the stripe pattern.

At the beginning of the detailed description, minutiae and their features (data) representing a stripe pattern are defined. The end point such as $2a$ to $2e$ of FIG. 2 and the bifucation such as $3a$ are called minutiae and a minutia and a set of minutiae of a searching stripe pattern are expressed by $S_i$ and $\{S_i\}$ (i=1, 2, . . . , I), respectively, while those of a filed stripe pattern are represented by $F_j$ and $\{F_j\}$ (j=1, 2, . . . , J). Coordinates and direction of a minutia of the searching stripe pattern are expressed as $(X_i, Y_i)$ and $D_i$, respectively. A child minutia and its coordinates of a minutia $S_i$ of the searching stripe pattern are expressed as $S_{ik}$ and $(X_{ik}, Y_{ik})$ (k=1, 2, 3, 4) respectively, and relation between a minutia $S_i$ and its child minutia $S_{ik}$ by $R_{ik}$. In the same way, coordinates, direction, child minutia, coordinates of the child minutia aid relation between the child minutia of a minutia $F_j$ of a filed stripe pattern are expressed as $(X_j, Y_j)$, $D_j$, $F_{jk}$, $(X_{jk}, Y_{jk})$ and $R_{jk}$, respectively.

Figure 1:
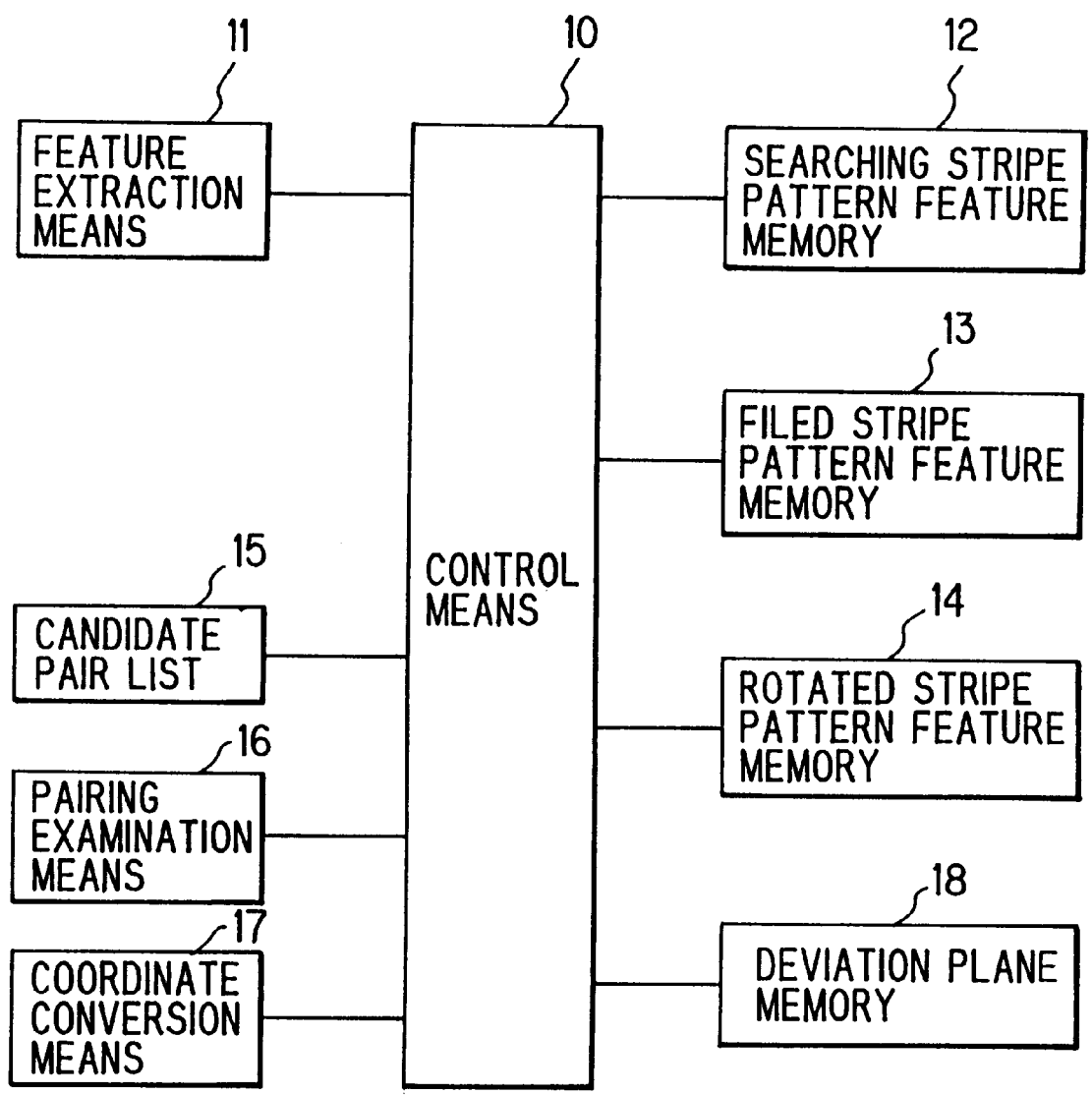
FIG. 1 is a block diagram illustrating a stripe pattern matching system according to an embodiment of the invention.

FIG. 1 is a block diagram illustrating a stripe pattern matching system according to an embodiment of the invention, comprising:

a feature extraction means 11 for extracting features of minutiae $\{S_i: (X_i, Y_i), D_i, \{S_{ik}\}\}$ from image data of a searching stripe pattern supplied from an input device such as a scanner;

a searching stripe pattern feature memory 12 for storing the features extracted by the feature extraction means 11 to be read out at any time;

a filed stripe pattern feature memory 13 wherein prepared the features of minutiae $\{F_j: (X_j, Y_j), D_j, \{F_{jk}\}\}$ of a plurality of filed stripe patterns to be read out at any time;

a coordinate conversion means 17 for generating coordinates and direction of each of a rotated minutia set by rotating coordinates $(X_i, Y_i)$ and direction $D_i$ of each of the set of minutiae $\{S_i\}$ of the searching stripe pattern by a designated angle around a designated point (origin, for example) of the X-Y plane;

a rotated stripe pattern feature memory 14 for storing the features generated by the coordinate conversion means 17 to be read out at any time;

a pairing examination means 16 for evaluating correspondence value $v_{ij}$ (which will be described afterwards) between a minutia $S_i$ of a searching stripe pattern stored in the searching stripe pattern feature memory 12 and a minutia $F_j$ of a filed stripe pattern prepared in the filed stripe pattern feature memory 13, and listing up a candidate pair $C_{ij}(S_i: F_j/v_{ij})$ when the correspondence value $v_{ij}$ between the minutiae $S_i$ and $F_j$ is larger than a threshold value;

a candidate pair list 15 wherein the candidate pair listed up by the pairing examination means 16 is registered;

a deviation plane memory 18 for accumulating the correspondence value $v_{ij}$ of each of the candidate pairs $\{C_{ij}(S_i: F_j/v_{ij})\}$ satisfying a certain condition at an address thereof indicated by deviation coordinates of concerning each of the candidate pairs defined by the rotated coordinates of a minutia of the searching stripe pattern and coordinates of a minutia of the filed stripe pattern of the concerning each of the candidate pairs (which will be described after wards); and a control means 10 for controlling the feature extraction means 11, the searching stripe feature memory 12, the filed stripe pattern feature memory 13, the rotated stripe pattern feature memory 14, the candidate pair list 15, the pairing examination means 16, the coordinate conversion means 17 and the deviation plane memory 18.

When a rotation angle c around a point (a, b) on the X-Y plane are designated, the coordinate conversion means 17 converts coordinates $(X_i, Y_i)$ and direction $D_i$ of a minutia $S_i$ into rotated coordinates $(X_i^c, Y_i^c)$ and rotated direction $D_i^c$ as follows:

$X_i^c = (X_i - a)\cos(D_i - c) + (Y_i - b)\sin(D_i - c)$ $Y_i^c = (Y_i - b)\cos(D_i - c) - (X_i - a)\sin(D_i - c)$ $D_i^c = D_i - c$ The coordinate conversion means 17 may also generate a certain number (40, for example) of rotated minutia sets sequentially by rotating coordinates of the set of minutia $\{S_i\}$ certain times (20 times forward and 20 times backward, for example) by a fixed degree (1.40°, for example).

Now, operation of the stripe pattern matching system of FIG. 1 is described referring to a flowchart of FIG. 3, wherein the rotated minutia set is described to be calculated each time, for convenience of the comparison with the prior art described in connection with FIG. 16.

After initializing a maximum matching value MSC and an ID number N of a most matching filed stripe pattern to zero, a set of minutiae $\{S_i\}$ is extracted by the feature extraction means 11 from a searching stripe pattern S at step 31 and stored in the searching stripe feature memory 12. The searching stripe pattern S may be obtained directly through an image input device such as a scanner or may be transmitted by way of electronic data from a remote terminal through a network.

Then at step 32, a set of J minutiae $\{F_j\}$ (j=1, 2, ..., J) of a filed stripe pattern F and its ID number n are read out from the filed stripe pattern feature memory 13.

Then at step 33, every pair of a minutia $S_i$ and a minutia $F_j$ giving the correspondence value $v_{ij}$ not smaller than the threshold value is listed in the candidate pair list 15 as a candidate pair $C_{ij}(S_i: F_j/v_{ij})$ when direction difference between the two minutiae is within a designated value, ±28.0°, for example, regardless of their positions. The restriction of the direction difference is provided here for comparing to the procedure of FIG. 16. However, the restriction may not be provided without any inconvenience.

At step 33, the correspondence value $v_{ij}$ is evaluated as follows by the pairing examination means 16.

Among threshold values TT, TD, TR and TS prepared in the pairing examination means 16, TD, TR and TS are considered here at step 33. For each minutia $S_i$: $(X_i, Y_i)$, $D_i$, $\{F_{ik}\}$, $\{R_{ik}\}$ (k=1 to 4) of the searching stripe pattern S, J minutiae $\{F_j$: $(X_j, Y_j)$, $D_j$, $\{F_{jk}\}$, $\{R_{jk}\}$ (k=1 to 4)$\}$ are input one by one. When absolute direction difference $|D_i-D_j|$ between the minutia $S_i$ and a minutia $F_j$ is not more than TD (28.0°, in the example), relation differences $\{|R_{ik}-R_{jk}|\}$ (k=1 to 4) are checked between them, and when a number SPC of the relation differences which is not smaller than TR is not smaller than TS, the pair of the minutiae $S_i$ and $F_j$ is registered in the candidate pair list as a candidate pair $C_{ij}(S_i: F_j/v_{ij})$ substituting the correspondence value $v_{ij}$ with the number SPC.

Then at step 34, a certain number of candidate pairs $\{C_{mn}(S_m: F_n/v_{mn})\}$ having correspondence values not smaller than those of other candidate pairs are selected as the axial candidates among whole set of candidate pairs $\{C_{ij}(S_i: F_j/v_{ij})\}$.

A maximum concentration M, a most appropriate rotation angle R and most appropriate shifting coordinates (ΔX, ΔY) are also initialized to zero, here at step 34.

Then at step 35, the coordinate conversion means 17 converts coordinates $(X_i, Y_i)$ of minutiae $\{S_i\}$ listed in the candidate pair list 15 around a point (x, y) with a rotation angle r, substituting the coordinates (x, y) and the rotation angle r with coordinates $(X_m, Y_m)$ of minutia $S_m$ and direction difference between minutiae of each of the axial candidates $\{C_{mn}(S_m: F_n/v_{mn})\}$, one by one, as previously described, and correspondence value $v_{ij}$ of each candidate pair $C_{ij}(S_i: F_j/v_{ij})$ is plotted and accumulated on a deviation plane for each rotation angle r, as follows.

When a concerning axial candidate $C_{mn}(S_m: F_n/v_{mn})$ has a direction difference r, reference deviations $(\Delta X_{mn}, \Delta Y_{mn})$ between the minutia $S_m$ of the searching stripe pattern and the corresponding minutia $F_n$ of the filed stripe pattern are defined as $\Delta X_{mn}=X_m-X_n$ and $\Delta Y_{mn}=Y_m-Y_n$.

Then rotated coordinates $(X_i^r, Y_i^r)$ and rotated direction $D_i^r$ of minutia $S_i$ of every of the candidate pairs $\{C_{ij}(S_i: F_j/v_{ij})\}$ are compared with coordinates $(X_j, Y_j)$ and direction $D_j$ of its corresponding minutia $F_j$.

When direction deviation $\Delta D_{ij}^r$ and differences of coordinate deviations $(\Delta X_{ij}^r, \Delta Y_{ij}^r)$ to the reference deviations $(\Delta X_{mn}, \Delta Y_{mn})$ satisfy following conditions, $|\Delta D_{ij}^r|=|D_i^r-D_j|\leq TD$,
$|\Delta X_{ij}^r-\Delta X_{mn}|=|(X_i^r-X_j)-(X_m-X_n)|\leq TT$, and
$|\Delta Y_{ij}^r-\Delta Y_{mn}|=|(Y_i^r-Y_j)-(Y_m-Y_n)|\leq TT$, correspondence value $v_{ij}$ of each of the candidate pairs $\{C_{ij}(S_i: F_j/v_{ij})\}$ is plotted and accumulated on each grid designated by coordinates $(\Delta X_{ij}^r, \Delta Y_{ij}^r)$ on a ΔX-ΔY discrete deviation plane.

This means that the correspondence values $\{v_{ij}\}$ are plotted and accumulated for candidate pairs wherein segments connecting between rotated minutia $S_i^r$ of the searching stripe pattern and its partner minutia $F_j$ is quasi parallel to that of a concerning axial candidate.

After every candidate pair is checked for a concerning axial candidate, concentrated deviation coordinates (ΔX', ΔY') having a largest accumulation M' of the correspondence values among grids of the discrete deviation plane are examined at step 36, and when the largest accumulation M' is larger than the maximum concentration M, the maximum concentration M, the most appropriate rotation angle R and the most appropriate shifting coordinates (ΔX, ΔY) are substituted with the largest accumulation M', the concentrated deviation coordinates (ΔX', ΔY') and the direction difference r of the concerning axial candidate.

Thus repeating steps 35 and 36 until all the axial candidates are considered (checked at step 37), the maximum concentration M, the most appropriate rotation angle R and the most appropriate shifting coordinates (ΔX, ΔY) of the searching stripe pattern S are obtained for a filed stripe pattern F.

Here, it is to be noted that the candidate pairs, and consequently, the axial candidates are selected according to correspondence value based on the relations defined relatively to each minutia direction, regardless of minutia coordinates, in the embodiment. Then, the most appropriate rotation angle R and the most appropriate shifting coordinates (ΔX, ΔY) of the searching stripe pattern S are determined relatively to minutia coordinates and direction difference of all appropriate axial candidate. Therefore, the most appropriate rotation angle R and the most appropriate shifting coordinates (ΔX, ΔY) of the minutiae $\{S_i\}$ of the searching stripe pattern S can be obtained independent of absolute coordinates or orientation of the searching stripe pattern S.

Figure 16:
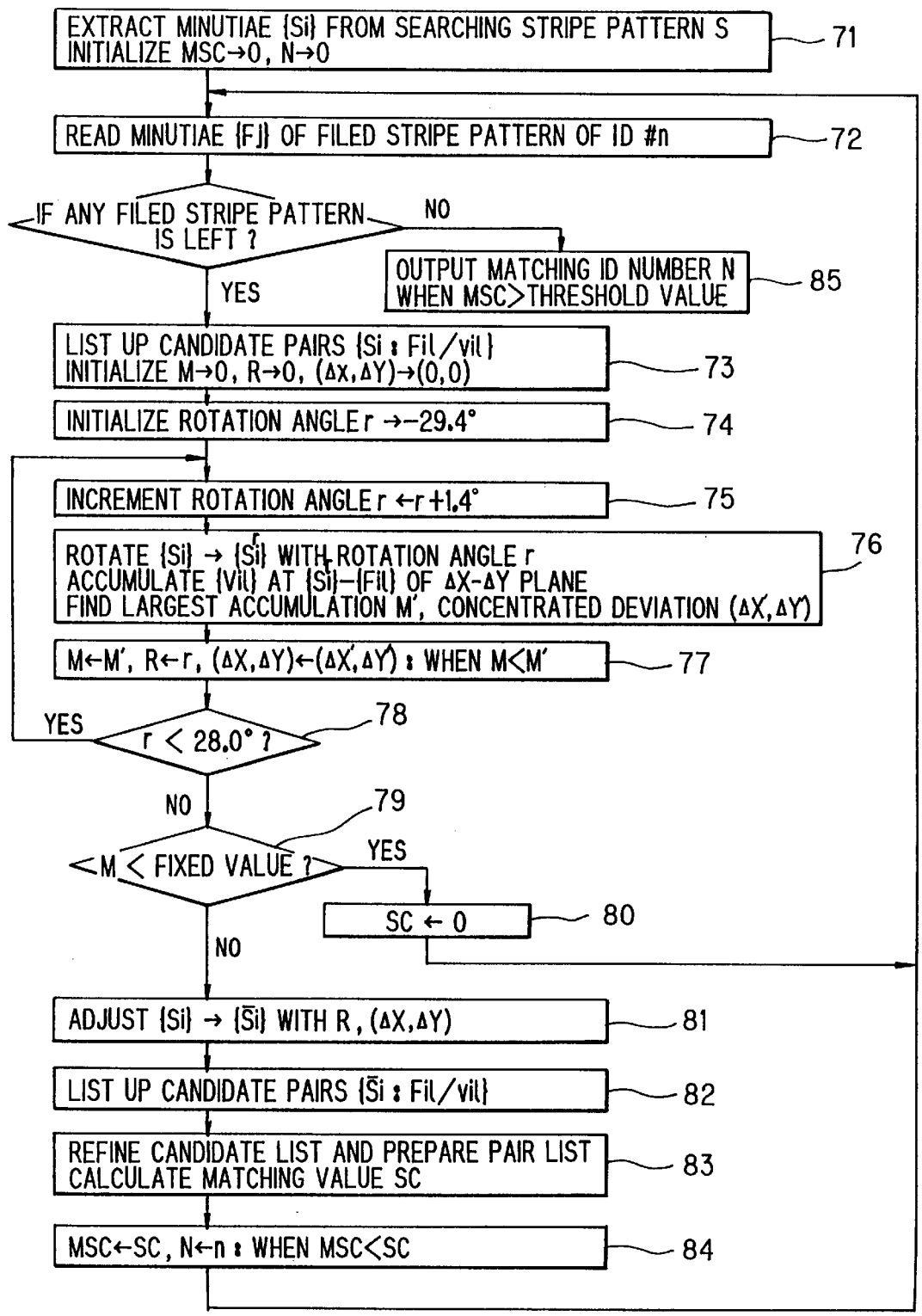
FIG. 16 is a flowchart illustrating detailed processes of the matching verification described in connection with FIG. 14.

This is the difference and merit of the invention compared to the prior art of FIG. 16.

When the maximum concentration M is found smaller than a fixed value at step 38, matching value SC of the concerning filed stripe pattern is set to zero (at step 39) considering there is no significant correspondence thereto, and the control returns to step 32 for verifying correspondence to a next filed stripe pattern.

When the maximum concentration M is larger than the fixed value, the control goes to step 40 for performing the detailed matching, which may be the same with the prior art of FIG. 16.

At step 40, coordinates and direction of every of the set of minutiae $\{S_i\}$ are adjusted by applying the most appropriate rotation angle R and the most appropriate shifting coordinates (ΔX, ΔY) as the adjustment values into a set of adjusted minutiae $\{\overline{S}_i\}$ by the coordinate conversion means 17.

At step 41, candidate pairs $\{C_{ij}(\overline{S}_i: F_j/v_{ij})\}$ are selected making use of the set of adjusted minutiae $\{\overline{S}_i\}$ instead of the original set of minutiae $\{S_i\}$.

Then at step 42, a pair list is extracted by rejecting duplicated candidate pairs, each correspondence value of the listed pair is reinforced or omitted, and a normalized sum of the correspondence values is calculated as the matching value SC of the searching stripe pattern to the concerning filed stripe pattern, whereof details will be described afterwards.

When the matching value SC is larger than the maximum matching value MSC, the maximum matching value MSC is replaced with the matching value SC and the ID number n of the concerning filed stripe pattern is assigned to the ID number N of the most matching filed stripe pattern at step 43.

Then, the control is returned to step 32, for repeating processes from step 32 to step 43 until there is found no filed stripe pattern to perform matching therewith.

Finally at step 44, the maximum matching value MSC thus revised is compared with a threshold value. When the maximum matching value MSC is larger than the threshold value, the ID number N is output as the ID number of the most matching filed stripe pattern, and otherwise, it is reported that there is found no matching filed stripe pattern.

In the above procedure, the rotated minutia set $\{S_i^r\}$ is calculated at step 35 by the coordinate conversion means 17 each time for each axial candidate by applying direction difference r of the axial candidate, in connection with each filed stripe pattern.

However, when there are a lot of filed stripe patterns, an enormous calculation becomes necessary. For eliminating this problem, the coordinate conversion means 17 may prepare a certain number of rotated minutia sets sequentially by rotating coordinates of the set of minutia $\{S_i\}$ certain times by a fixed degree, when a minutia set $\{S_i\}$ is extracted from a searching stripe pattern by the feature extraction means 11.

Figure 4:
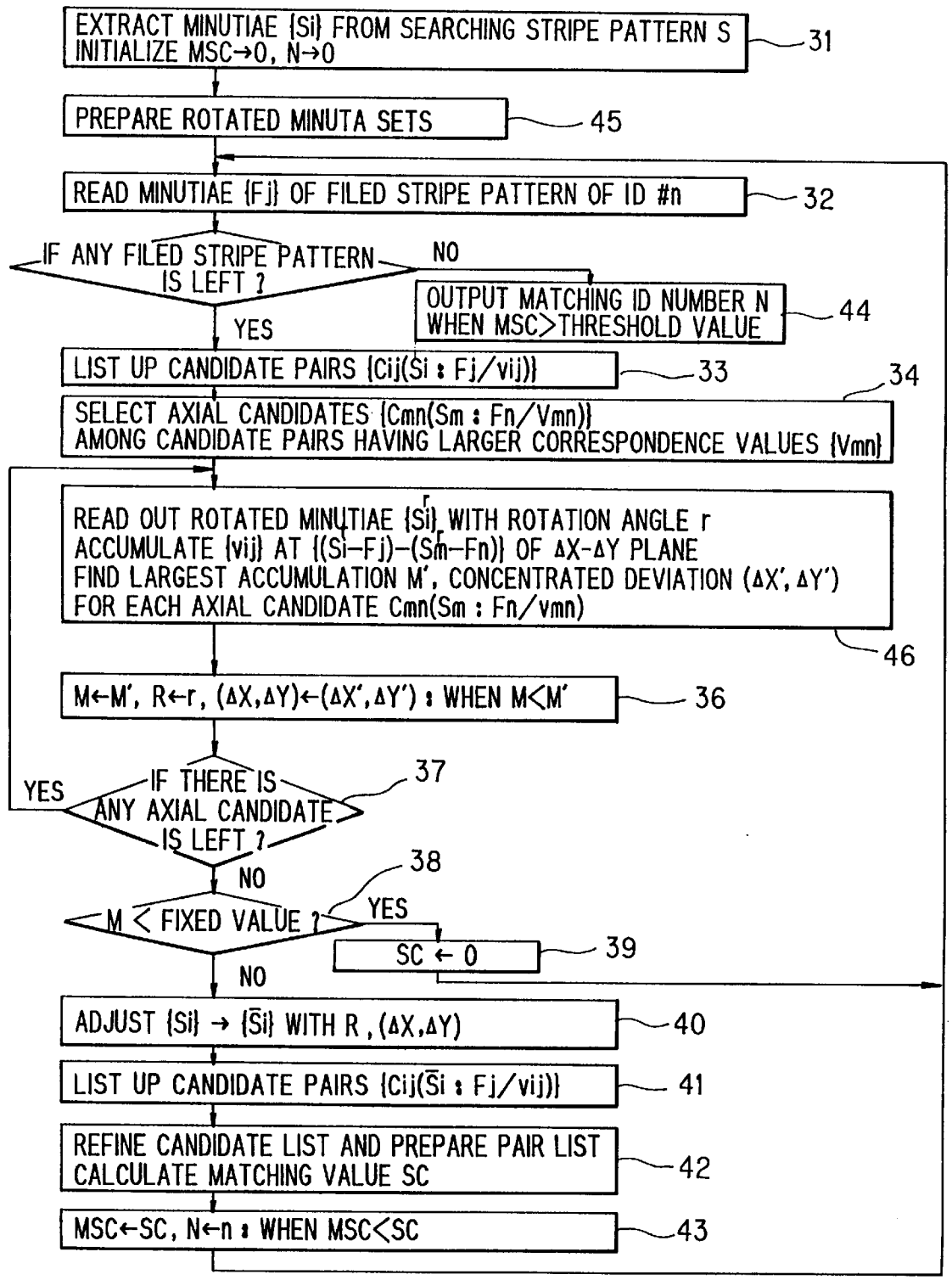
FIG. 4 is a flowchart illustrating another operational processes of the matching system of FIG. 1 wherein certain numbers of rotated minutia sets are beforehand prepared.

FIG. 4 is a flowchart illustrating operational processes of the matching system of FIG. 1 wherein the certain numbers of rotated minutia sets are beforehand prepared.

Figure 3:
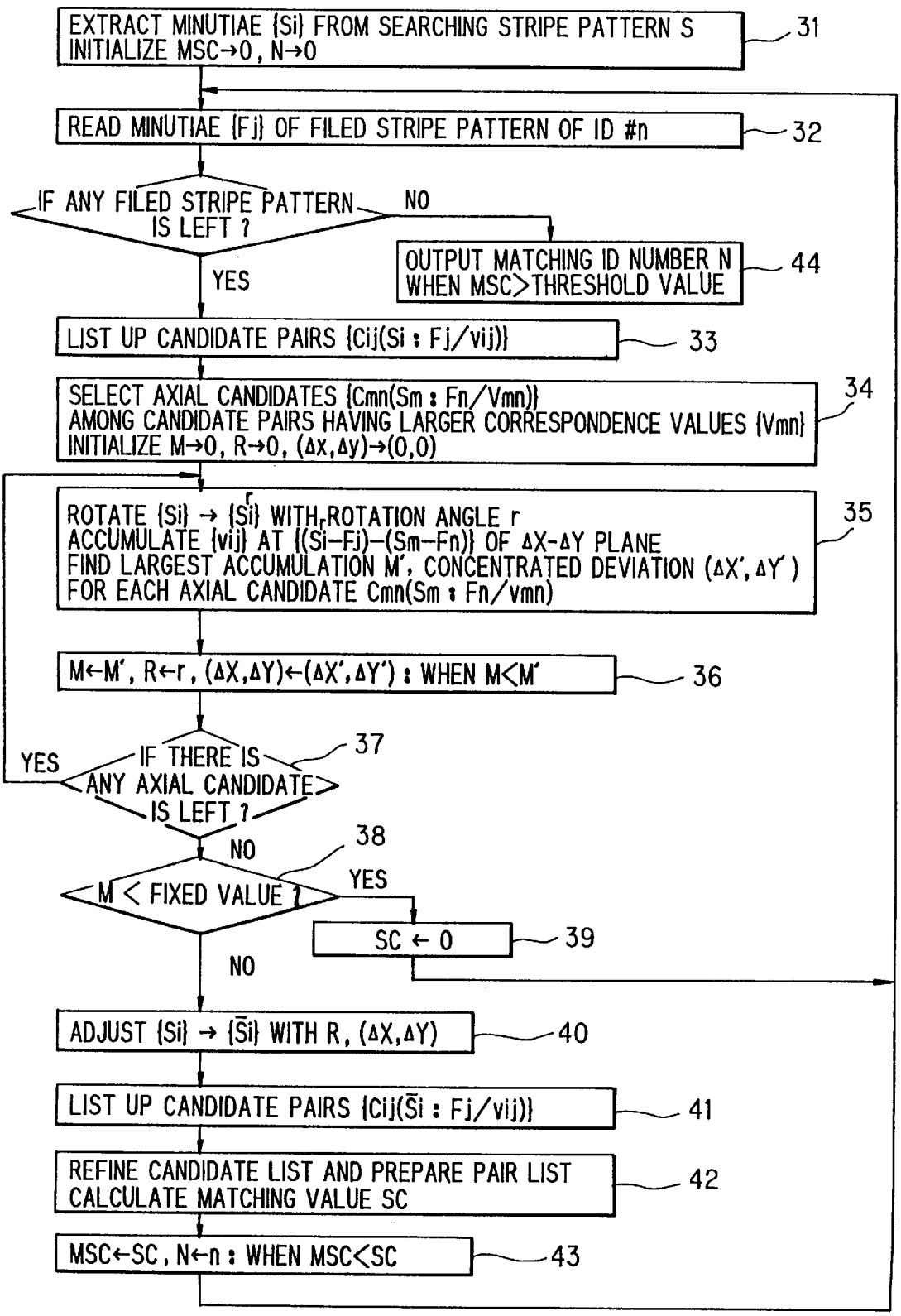
FIG. 3 is a flowchart illustrating operation of the stripe pattern matching system of FIG. 1.

A set of minutiae $\{S_i\}$ is extracted by the feature extraction means 11 from a searching stripe pattern S at step 31 and stored in the searching stripe feature memory 12, in the same way with FIG. 3.

Then at step 45, a certain number (40, for example) of rotated minutia sets are calculated by the coordinate conversion means 17 sequentially by rotating coordinates of the set of minutia $\{S_i\}$ certain times (20 times forward and 20 times backward, for example) by a fixed degree (1.4°, for example) around origin (for example) of the X-Y plane, which are stored in the rotated stripe pattern feature memory 14.

Then axial candidates $\{C_{mn}(S_m: F_n/v_{mn})\}$ are selected in the same way with FIG. 3 at steps 32 to 34.

At step 46, reference deviations $(\Delta X_{mn}^r, \Delta Y_{mn}^r)$ are defined as follows for an axial candidate $C_{mn}(S_m: F_n/v_{mn})$ having a direction difference r;

$\Delta X_{mn}^r = X_m^r - X_n$, and $\Delta Y_{mn}^r = Y_m^r - Y_n$, where $(X_m^r, Y_m^r)$ are rotated coordinates of the minutia $S_m$ of the axial candidate read out from the rotated stripe pattern feature memory 14 accessed with the direction difference r, instead of the reference deviations $\Delta X_{mn} = X_m - X_n$ and $\Delta Y_{mn} = Y_m - Y_n$ used at step 35 of FIG. 3.

Then rotated coordinates $(X_i^r, Y_i^r)$ and rotated direction $D_i^r$ of minutia $S_i$ of every of the candidate pairs $\{C_{ij}(S_i: F_j/v_{ij})\}$ read out from the rotated stripe pattern feature memory 14 are compared with coordinates $(X_j, Y_j)$ and direction $D_j$ of its corresponding minutia $F_j$.

When direction deviation $\Delta D_{ij}^r$ and differences of coordinate deviations $(\Delta X_{ij}^r, \Delta Y_{ij}^r)$ to the reference deviations $(\Delta X_{mn}^r, \Delta Y_{mn}^r)$ satisfy following conditions, $|\Delta D_{ij}^r| = |D_i^r - D_j| \leq TD$, $|\Delta X_{ij}^r - \Delta X_{mn}^r| = |(X_i^r - X_j) - (X_m^r - X_n)| \leq TT$, and $|\Delta Y_{ij}^r - \Delta Y_{mn}^r| = |(Y_i^r - Y_j) - (Y_m^r - Y_n)| \leq TT$, correspondence value $v_{ij}$ of each of the candidate pairs $\{C_{ij}(S_i: F_j/v_{ij})\}$ is plotted and accumulated on each grid designated by coordinates $(\Delta X_{ij}^r, \Delta Y_{ij}^r)$ on the $\Delta X$-$\Delta Y$ discrete deviation plane, in a similar way with the processes performed at step 35 of FIG. 3.

Then, the same processes 36 to 43 with FIG. 3 follow and duplicated description is omitted.

Now, details of the detailed matching will be described.

At step 41, reinforcement amid omission of the correspondence value of candidate pairs are performed as follows.

As for coordinate deviations and direction deviation between two corresponding minutiae of the searching stripe pattern and the filed stripe pattern, they should converge to zero after coordinate adjustment if the searching stripe pattern matches to the filed stripe pattern. Therefore, after selecting the candidate pairs $\{C_{ij}(\overline{S}_i: F_j/v_{ij})\}$ in the same way as selected at 34 making use of adjusted minutiae $\{\overline{S}_i\}$, coordinate deviations and direction deviation are checked with more severe threshold values TTS and TDS, and caiididate pairs which does not satisfy following conditions are rejected from the candidate pair list 15.

$|\Delta D_{ij}^R| = |D_i^R - D_j| \leq TDS$, $|\Delta X_{ij}^R| = |X_i^R - X_j| \leq TTS$, and $|\Delta Y_{ij}^R| = |Y_i^R - Y_j| \leq TTS$, where, $(X_i^R, Y_i^R)$ and $D_i^R$ are coordinates and direction of the adjusted minutiae $\overline{S}_i$.

This is the omission.

On the other hand, when two minutiae correspond to each other, their child minutiae too should correspond to each other.

Figure 5:
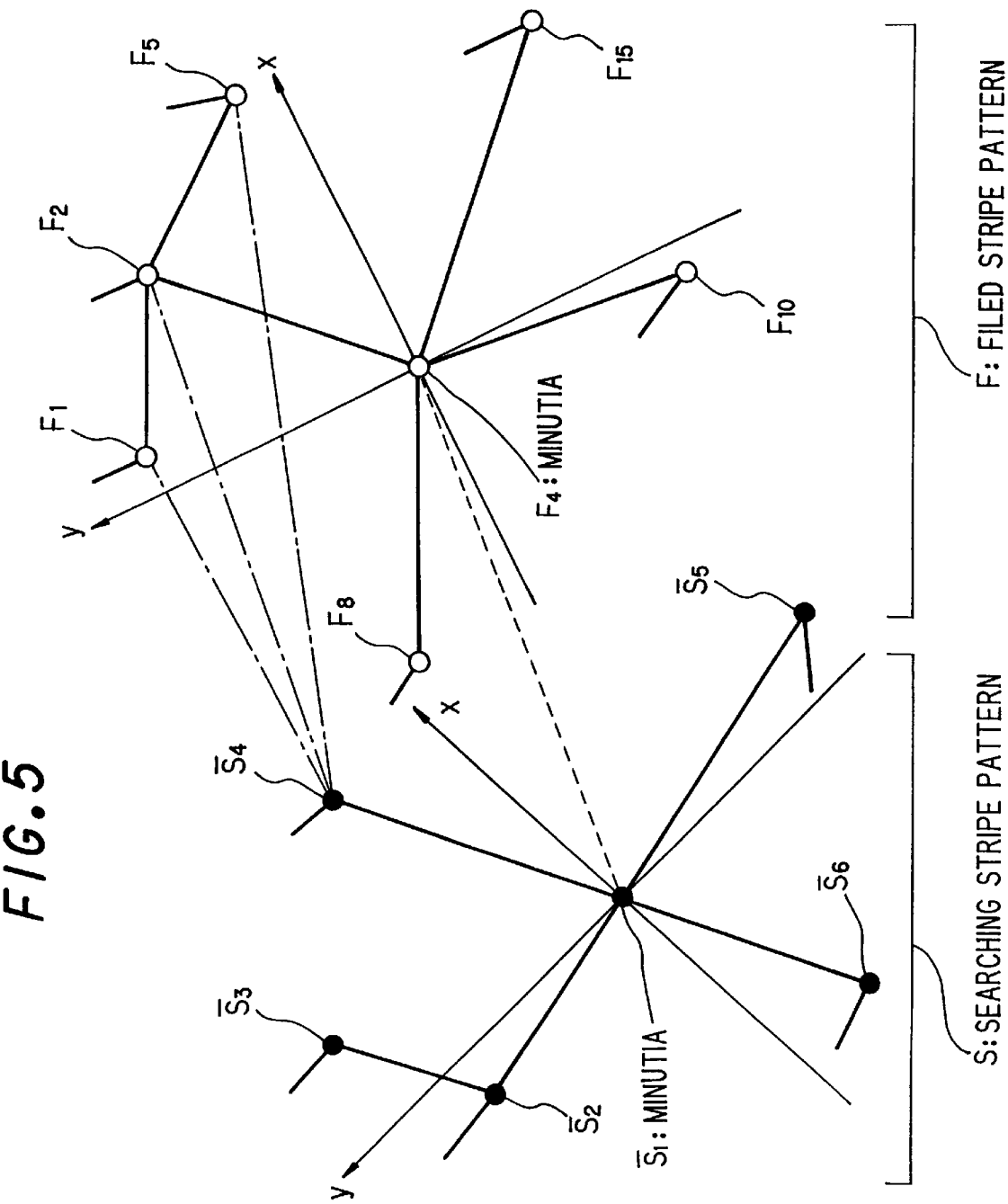
FIG. 5 is a pattern diagram illustrating correspondence between child minutiae.

FIG. 5 is a pattern diagram illustrating correspondence between child minutiae, wherein are listed four candidate pairs $C_{41}(\overline{S}_4: F_1/v_{41})$, $C_{42}(\overline{S}_4: F_2/v_{42})$, $C_{45}(\overline{S}_4: F_5/v_{45})$ and $C_{14}(\overline{S}_1: F_4/v_{14})$, minutiae $\overline{S}_1$ to $\overline{S}_6$ being adjusted minutiae. The minutia $\overline{S}_4$ is a child minutia of the minutia $\overline{S}_1$, that is, nearest minutia to the minutia $\overline{S}_1$ in its first quadrant, and the minutia $F_2$ is a child minutia of the minutia $F_4$.

Suppose here that the minutia $\overline{S}_1$ is a child minutia of the minutia $\overline{S}_4$, and the minutia $F_4$ is a child minutia of the minutia $F_2$, but the minutia $F_4$ is not the child minutia of the minutia $F_1$ nor the minutia $F_5$. In the case, correspondence value $V_{42}$ of the candidate pair $C_{42}(\overline{S}_4: F_2/v_{42})$ is reinforced being added with correspondence value $V_{14}$ of the candidate pair $C_{14}(\overline{S}_1: F_4/v_{14})$, other correspondence values $V_{41}$ and $v_{45}$ being left as they are. This is the reinforcement.

Figure 14:
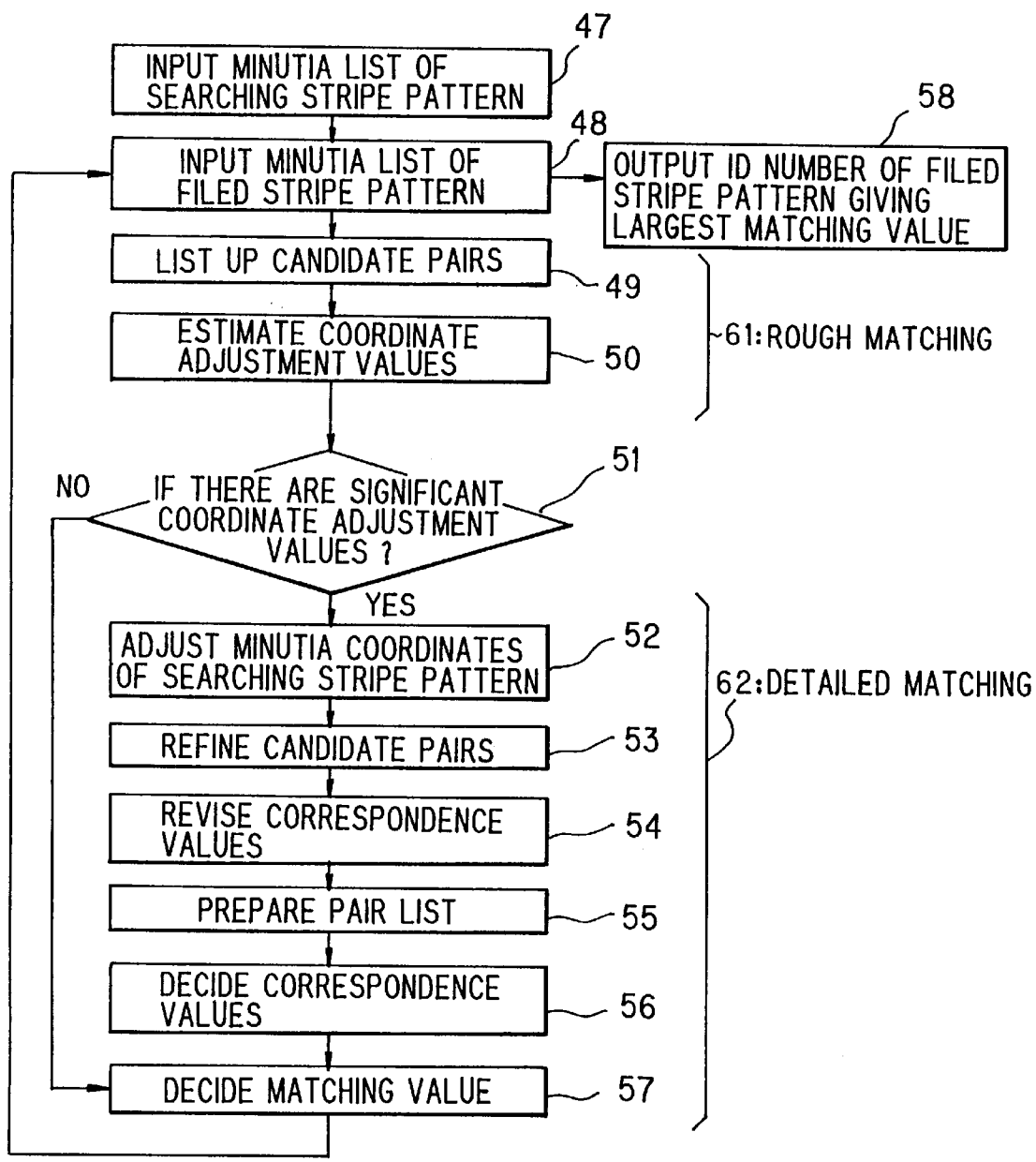
FIG. 14 is a flowchart illustrating an example of prior processes of the matching verification of the stripe pattern applied for identifying an unknown searching finger print gathered from a field by verifying its matching to one of a plurality of filed fingerprints already registered.
Figure 15:
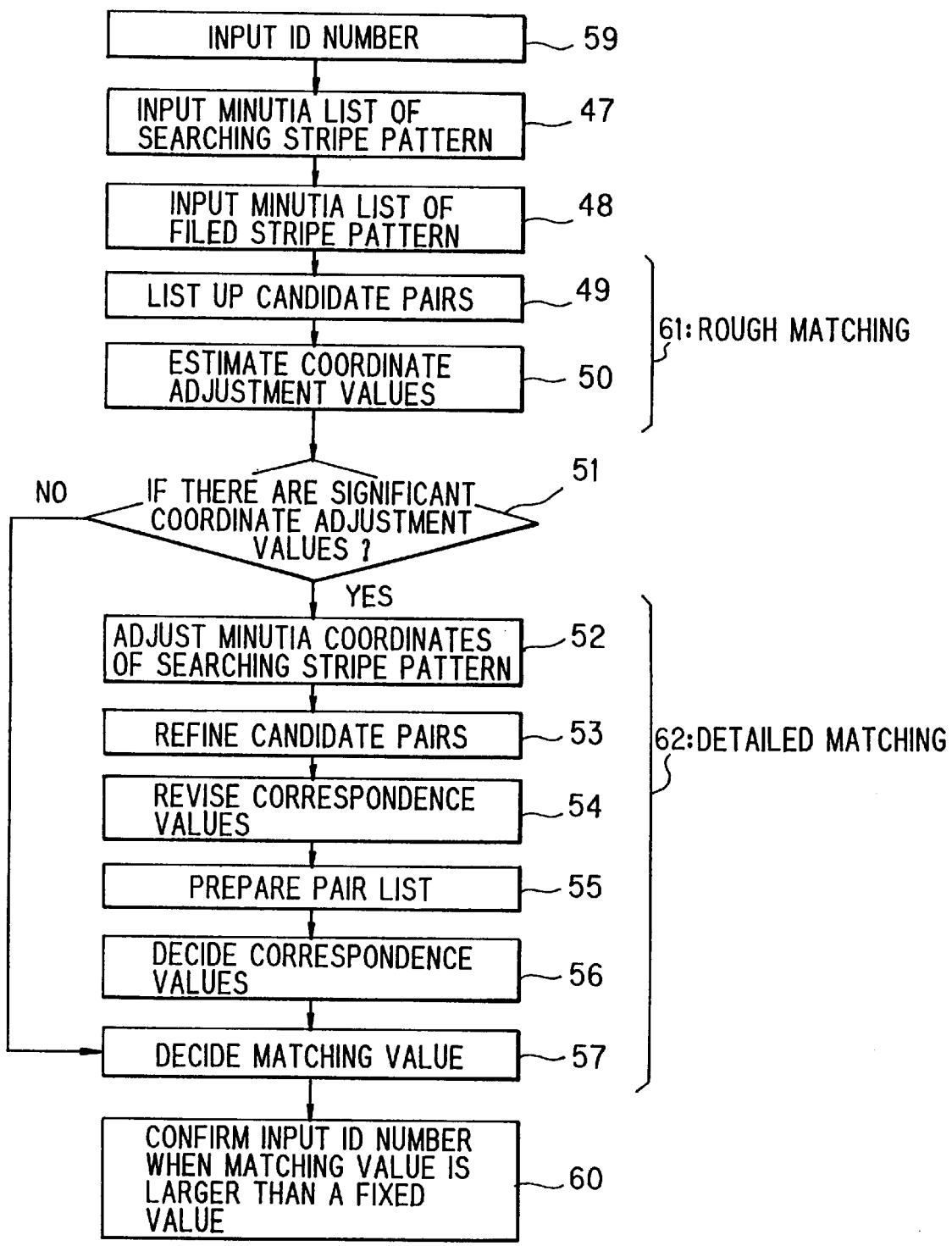
FIG. 15 is a flowchart illustrating another example of prior processes of the matching verification of the stripe pattern applied for confirming an individual by verifying matching of his fingerprint input together with his ID number to a specific fingerprint registered accompanied by the ID number.

From the candidate pair list 15 thus omitted and reinforced, a pair list is prepared in the same way as previously described in connection with step 55 of FIG. 14 or FIG. 15.

Then, unpaired minutiae are checked whether it is significant or not by checking if their partner minutiae are to be found in ineffective pattern area or not, or if they are one of opposing minutiae or not. When partner minutia of an unpaired minutia is to be found in an ineffective area of obscure image, for example, or the unpaired minutia is one of opposing minutiae, owing to interruption of ridge line or noise, for example, it is omitted from the effective minutiae to be verified.

After thus revising the correspondence values, a matching value is calculated (at step 42) by normalizing sum of the correspondence values of the pair list by number of the effective minutiae.

Heretofore, an example of the detailed matching is described. However, any appropriate method may be applied as to the detailed matching in the scope of the present invention. The characteristic feature of the invention lies in that the most appropriate rotation angle R and the most appropriate shifting coordinates ($\Delta X$, $\Delta Y$) of the minutiae $\{S_i\}$ can be obtained for coordinate adjustment of the searching stripe pattern S independent of absolute coordinates of the searching stripe pattern S such as core position of a fingerprint or orientation of the fingertip, as beforehand described.

In the following paragraphs, a concrete example of the above rough matching, namely the coordinate adjustment, is described referring to FIGS. 6 to 13.

Figure 6:
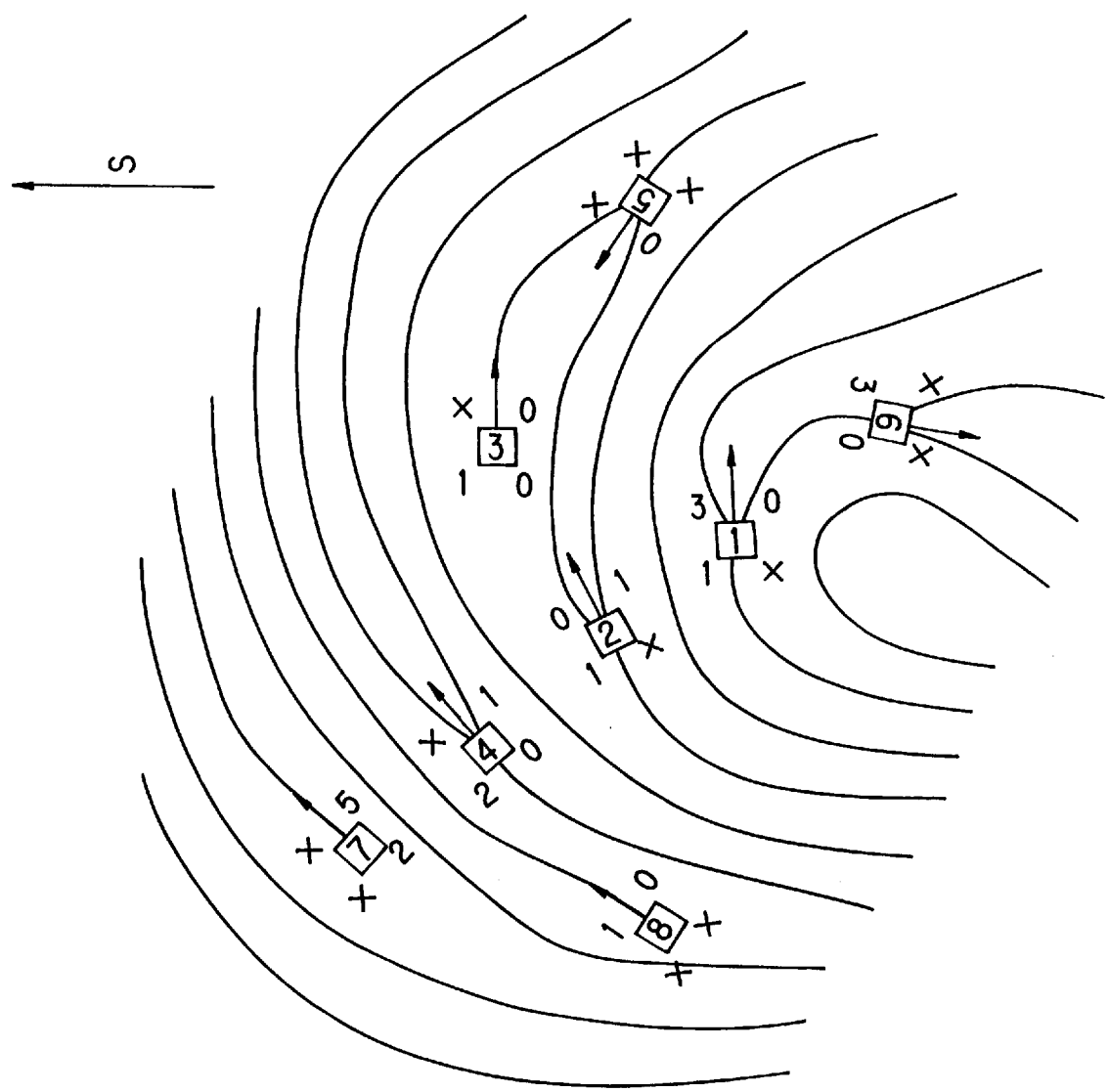
FIG. 6 is a pattern diagram illustrating an example of a searching stripe pattern.
Figure 7:
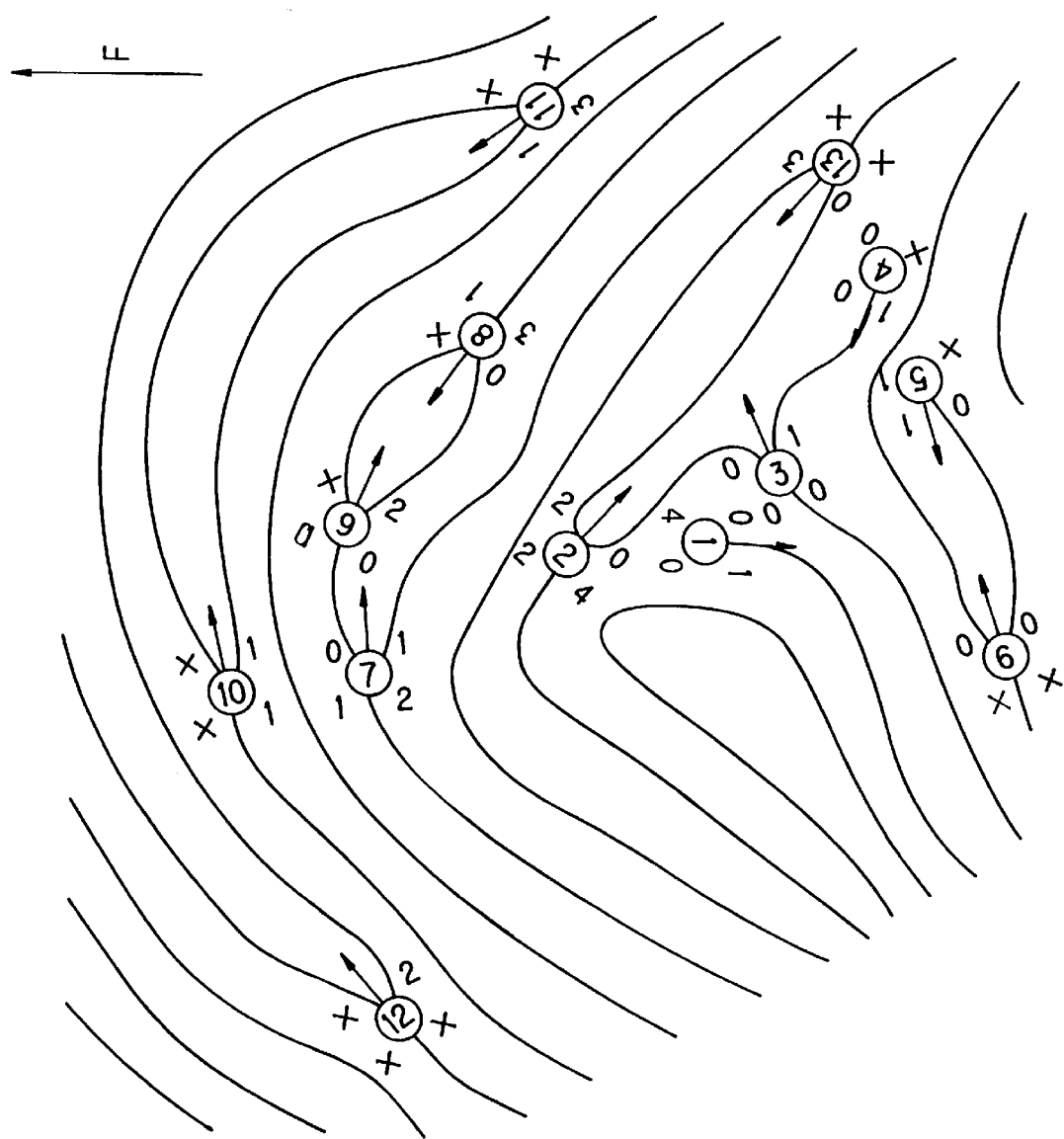
FIG. 7 is a pattern diagram illustrating an example of a filed stripe pattern whereto matching of the searching stripe pattern of FIG. 6 is verified.

FIG. 6 is a pattern diagram illustrating all example of a fingerprint S representing a searching stripe pattern, and FIG. 7 is a pattern diagram illustrating another example of fingerprint F representing a filed stripe pattern whereto matching of the fingerprint of FIG. 6 is verified. In FIGS. 6 amid 7, long arrow S or F indicates Y-direction of provisional X-Y plane having its origin at center of concerning image.

In FIG. 6, minutiae of the searching fingerprint S are represented by symbols [2] to [2], and each of four numerals at four corners of each thereof indicates the relation of the concerning quadrant of each minutia. When a relation is uncertain, it is expressed by x in place of numeral. Short arrow starting from each minutia indicates direction of the minutia. For example, relations of the first to the fourth quadrant of the minutia [2] are (0, 3, 1, x), respectively. Relations of four quadrants of the miniutia [2] to [2] are (1, 0, 1, x) to (0, 1, x, x), respectively.

In FIG. 7, miniutiae of the filed fingerprint F are represented by symbols (1) to (13). Relations and directions are expressed in the same way. Relations of four quadrants of the minutia (1) to (13) are (1, 0, 4, 0) to (3, 0, x, x), respectively.

Correspondence evaluation for listing up candidate pairs is performed as follows by the pairing examination means 16.

First, direction difference between two minutiae of every of possible pairs of a minutia of the searching fingerprint S and a minutia of the filed fingerprint F is checked for selecting pairs having direction difference whereof absolute value is not more than a threshold value TD (45°, for example). Then, difference between two sets of four relations of each of selected pairs is checked. When number of hit quadrants where difference of two corresponding relations is not more than a threshold value TR, 1, for example, is not fewer than a threshold value TS, 2, for example, in a selected pair, the selected pair is listed as a candidate pair given with a correspondence value v equal to the number of hit quadrants.

For example, the four relations of the minutia [2] of FIG. 6 are (0, 3, 1, x) and those of the minutia (2) of FIG. 7 are (0, 2, 2, 4). Hence, four (absolute) differences of relations between the minutiae become (0, 1, 1, ?), giving 3 hit quadrants, and so, the pair of the minutiae [2] and (2) is listed in the candidate pair list 15 as a candidate pair ([2]: (2)/3).

Thus, following 15 candidate pairs are listed between the searching fingerprint S of FIG. 6 and the filed fingerprint F of FIG. 7:

for minutia [2]: ([2]: (2)/3), ([2]: (3)/2), ([2]: (7)/2)

for minutia [2]: ([2]: (3)/3), ([2]: (7)/3), ([2]: (2)/2), ([2]: (9)/2)

for minutia [2]: ([2]: (3)/3), ([2]: (9)/2), ([2]: (10)/2)

for minutia [2]: ([2]: (3)/2), ([2]: (7)/2), ([2]: (10)/2), ([2]: (9)/2)

for minutia [2]: ([2]: (7)/2)

Figure 8:
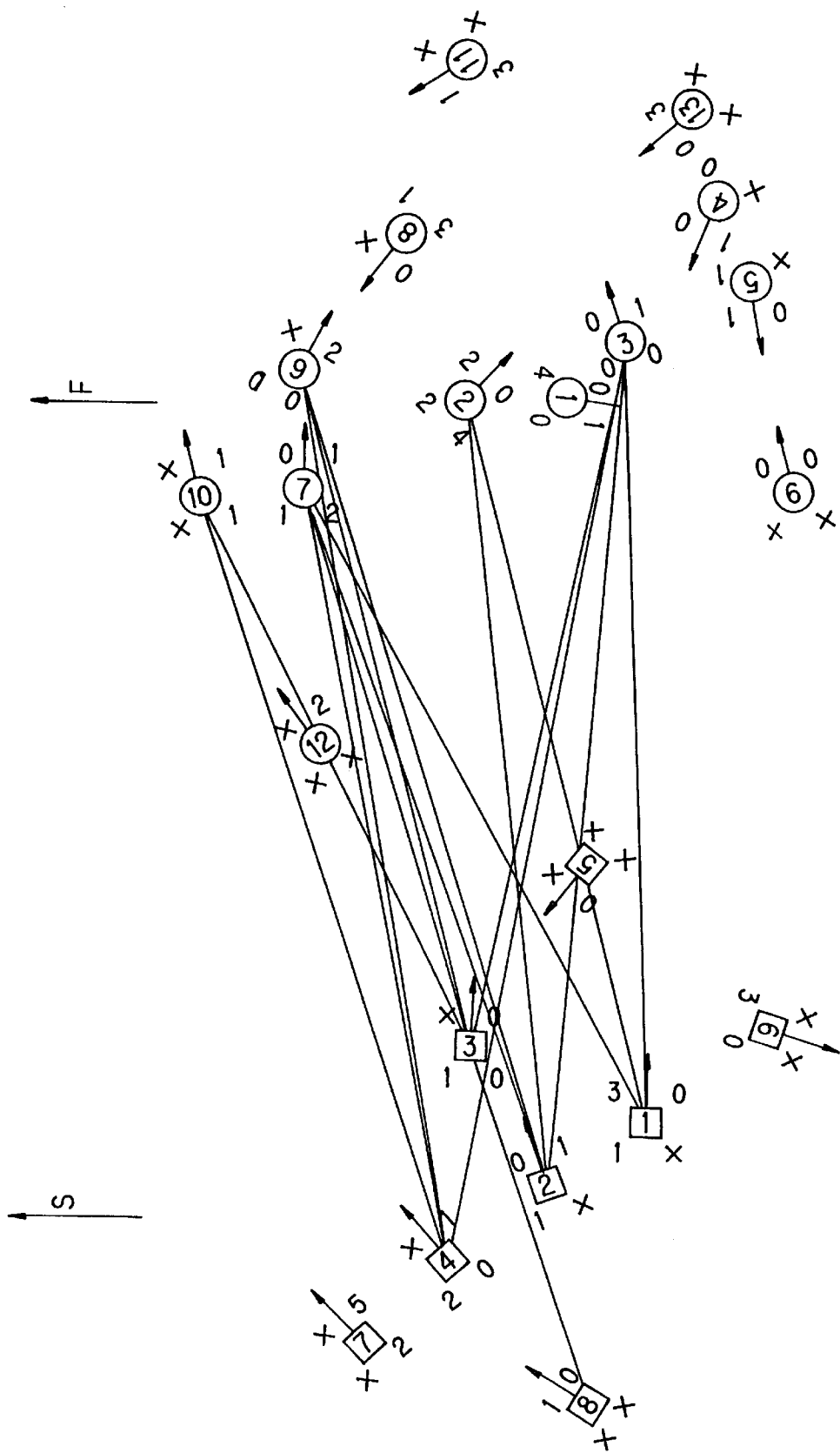
FIG. 8 is a schematic diagram wherein minutiae in FIG. 6 and FIG. 7 are illustrated in parallel on the same plane.

FIG. 8 is a schematic diagram wherein minutiae in FIG. 6 and FIG. 7 are illustrated in parallel on the same plane. Between two minutiae of each candidate pair listed in the candidate pair list 15, a solid line is drawn connecting them.

Among the candidate pairs, axial candidates are selected. All candidate pairs may be nominated as the axial candidates. However, it is better in practice to reduce the number of axial candidates by selecting candidate pairs having correspondence values not smaller than a certain value (3, for example) or selecting certain number of axial pairs in order of correspondence values. Here, in this example, candidate pairs having correspondence values not smaller than 3 are selected as the axial candidates, that is, ([2]: (2)/3), ([2]: (3)/3), ([2]: (7)/3) and ([2]: (3)/3).

Figure 9:
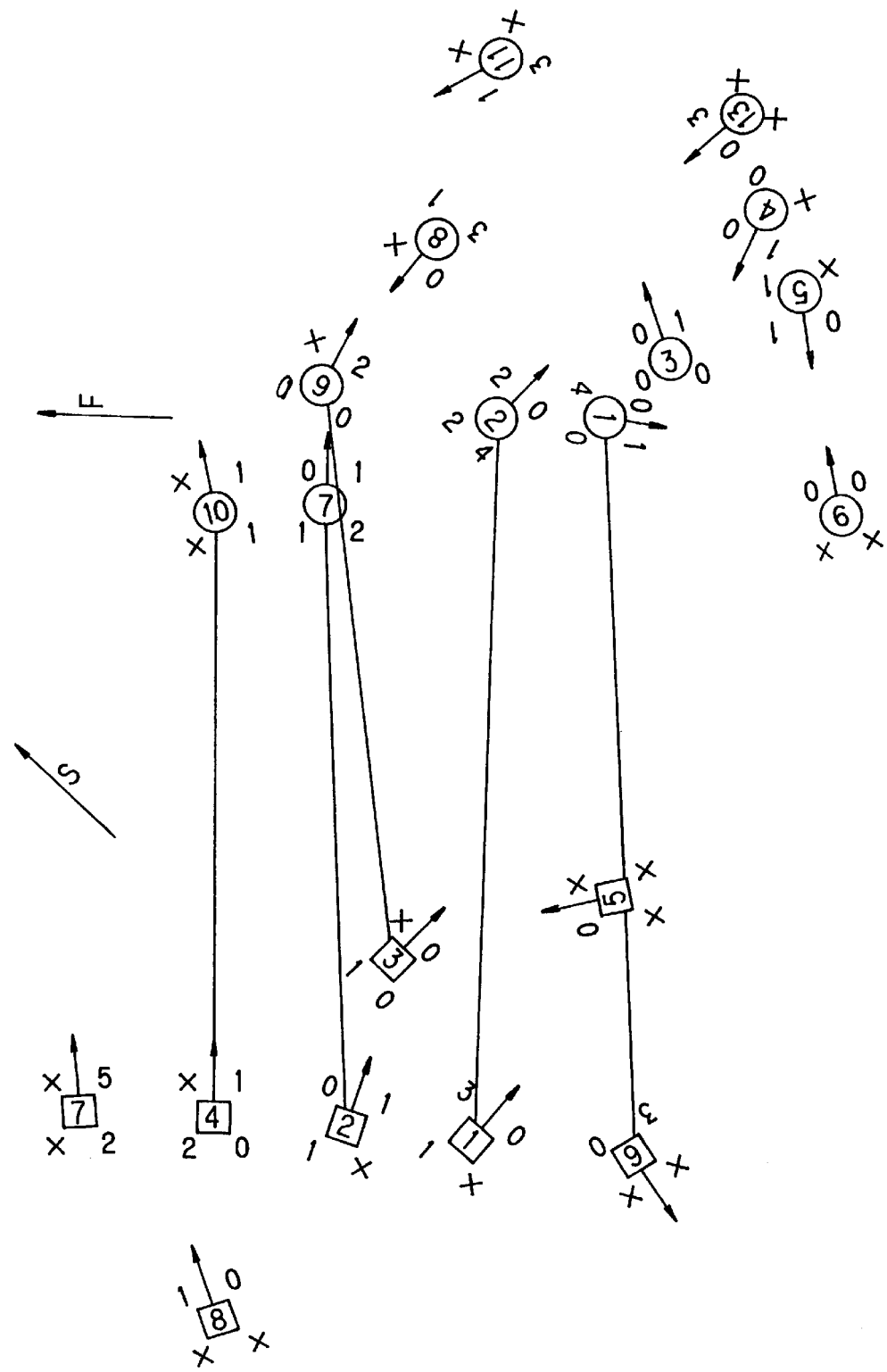
FIGS. 9 to 12 are schematic diagrams each illustrating processes performed at step 35 of FIG. 3.

FIG. 9 is a schematic diagram illustrating processes performed at step 35 of FIG. 3, wherein an axial candidate ([2]: (2)/3) is considered and minutiae of the searching fingerprint S is rotated around the minutia [2] in order to make direction of the minutia [2] coincide to direction of the minutia (2). Here, solid lines are drawn between two minutiae of the candidate pairs, which schematically show level of deviation concentration.

In FIG. 9, there are following five candidate pairs which have direction difference within the threshold value TD (45°) and coordinate deviation difference (to the reference deviation between minutiae [2] and (2)) within TT; ([2]: (2)), ([2]: (7)), ([2]: (9)), ([2]: (10)) and ([2]: (1)).

Figure 10:
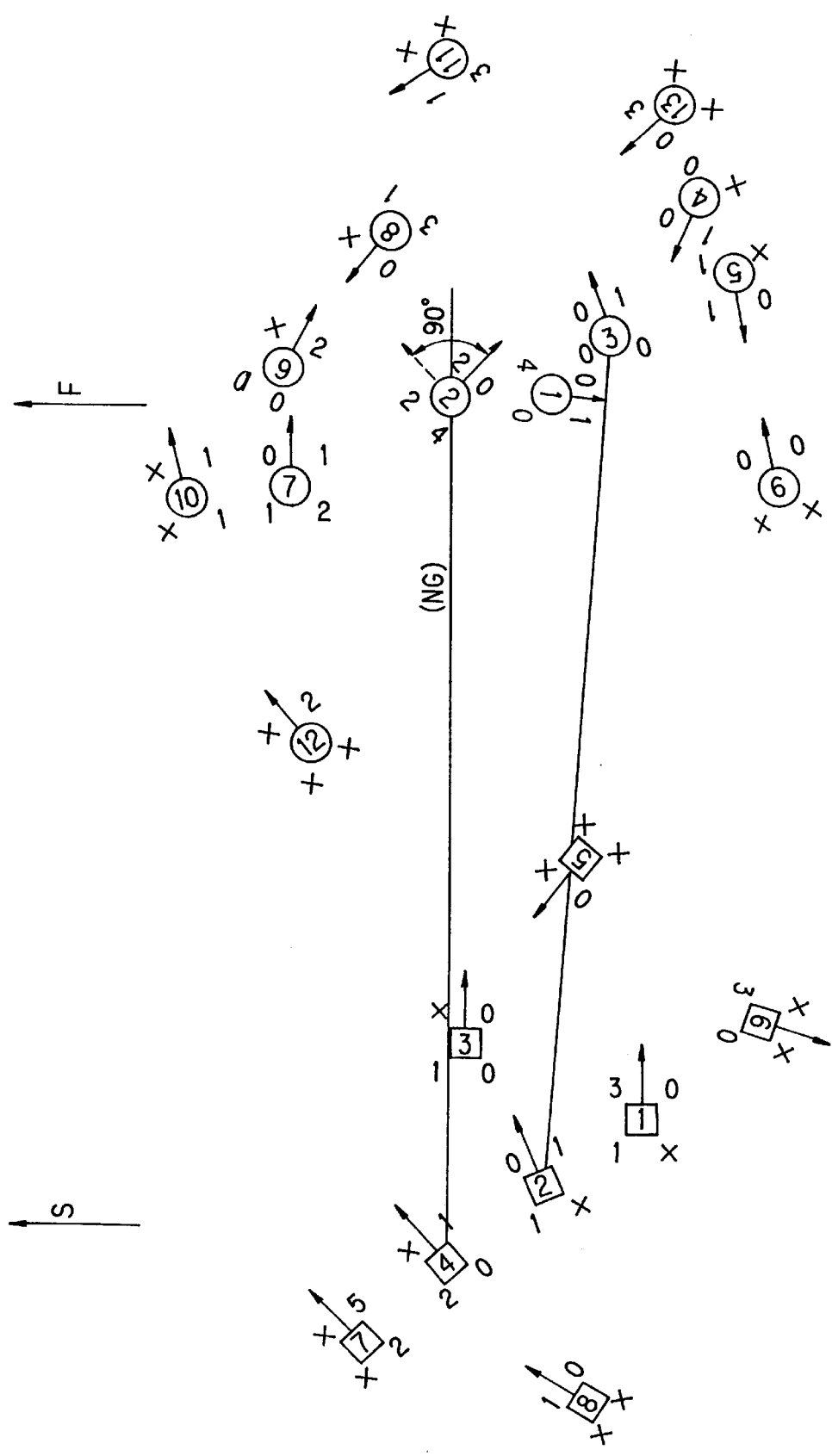

FIG. 10 is a schematic diagram obtained in the same way with FIG. 9 by considering another axial candidate ([2]: (3)/3). Here, an candidate pair ([2]: (2)) has coordinate deviation difference within TT, but direction difference thereof is about 90° which is larger than TD=45°. Therefore, there is but one candidate pair ([2]: (3)), the axial candidate itself, which satisfies the condition.

Figure 11:
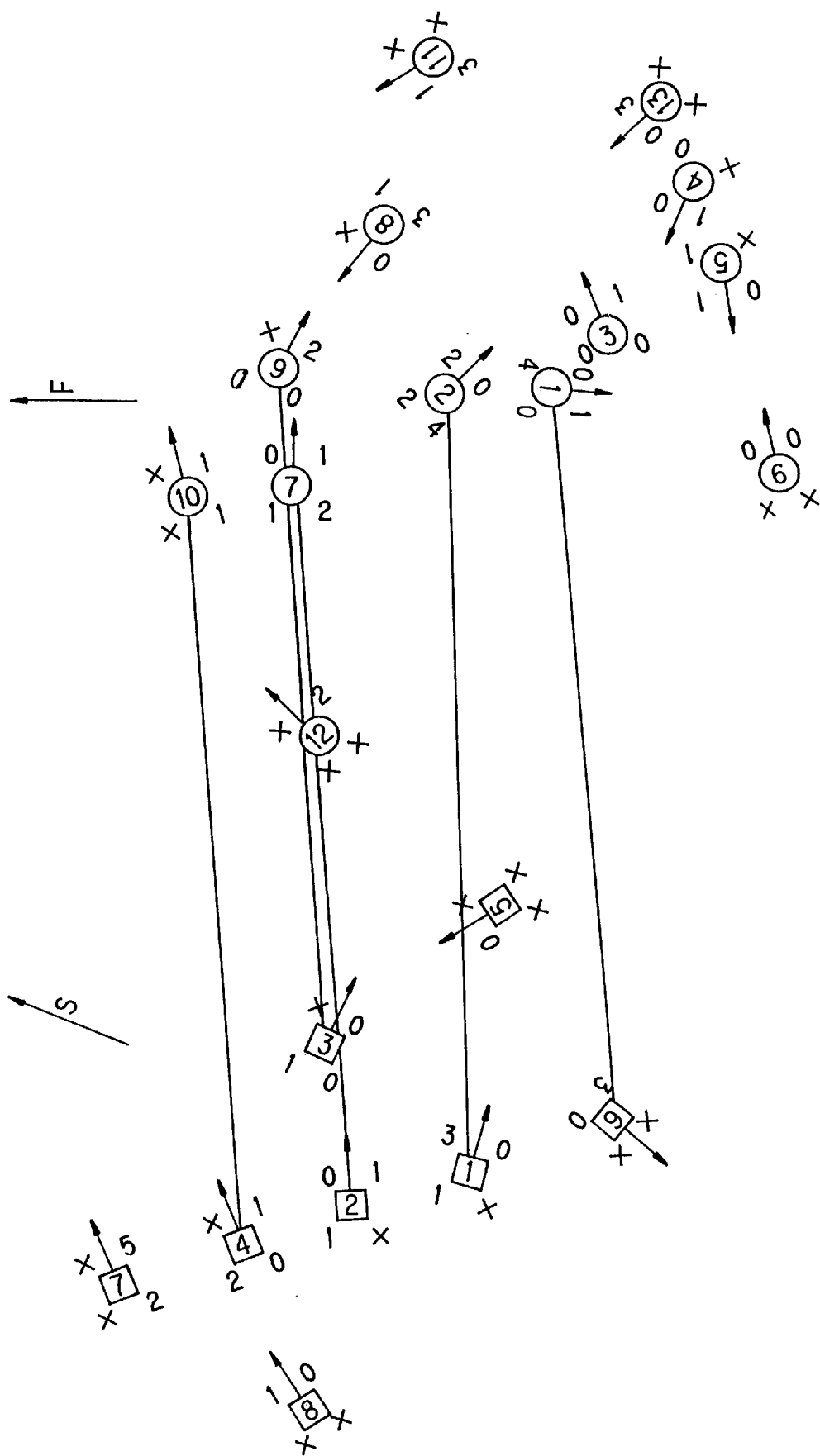

In FIG. 11, still another axial candidate ([2]: (7)/3) is considered, wherein the same numbers of candidate pairs with FIG. 9 satisfy the condition. However, the solid lines are more arranged in FIG. 11 than those of FIG. 9, which should give more intense concentration than FIG. 9.

Figure 12:
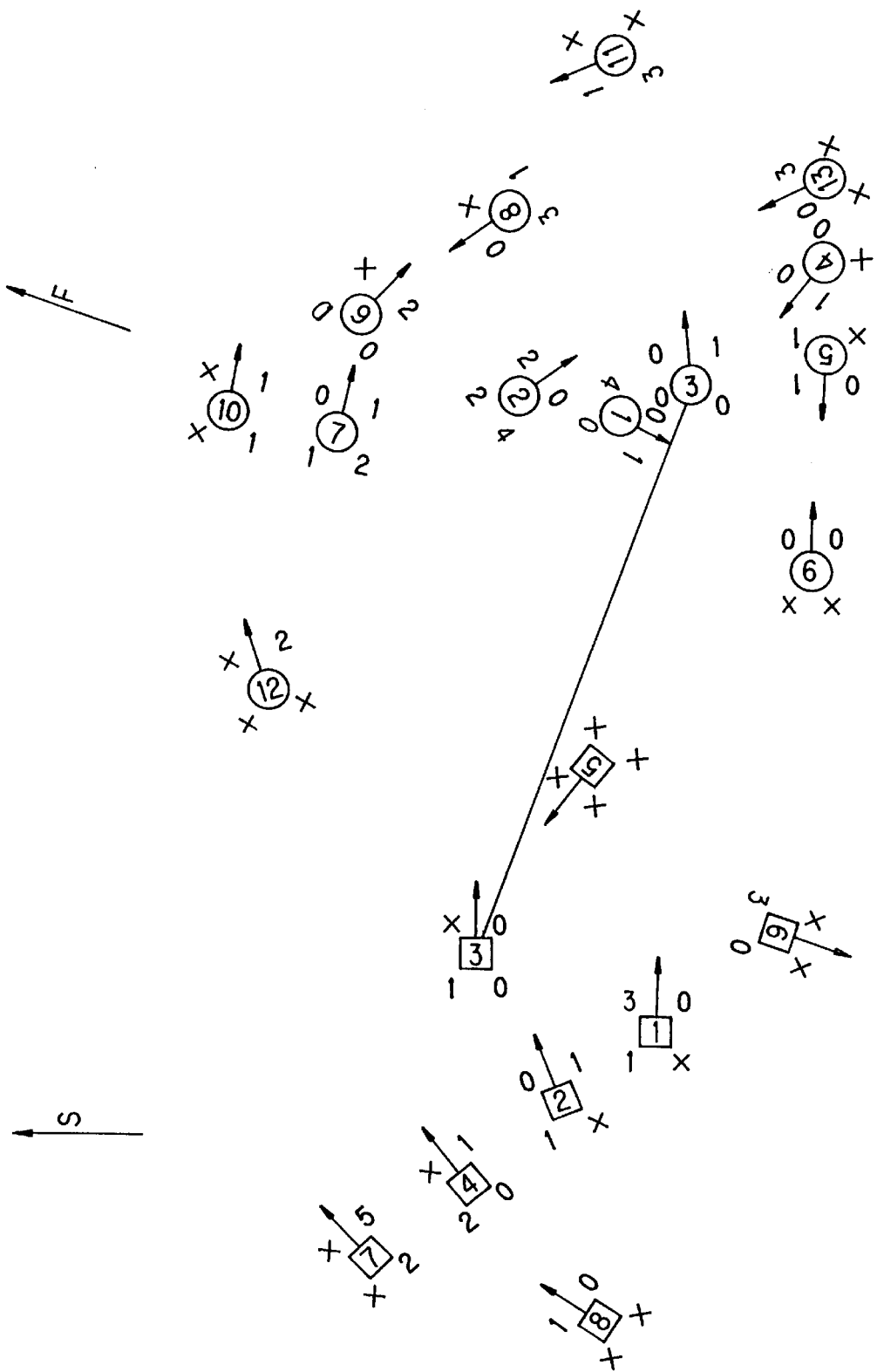

FIG. 12 which is obtained by considering still another axial candidate ([2]: (3)) shows little concentration having no other candidate pair satisfying the condition.

Thus, the axial candidate ([2],(7)) is found to give the most appropriate rotation angle R and the most appropriate shifting coordinates ($\Delta X$, $\Delta Y$) to be applied for adjusting the minutiae [2] to [2] of the searching fingerprint S to the filed fingerprint F.

Figure 13:
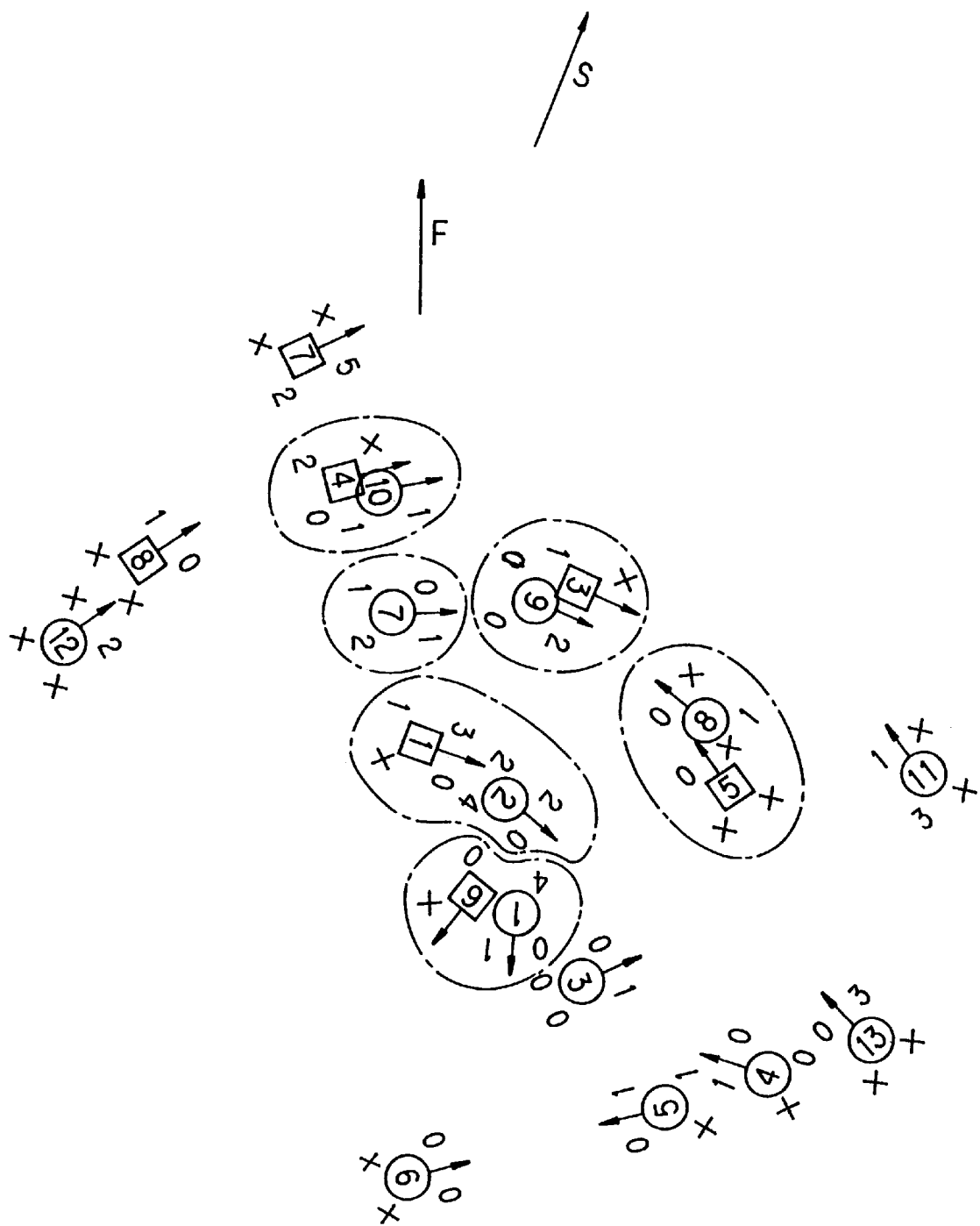
FIG. 13 shows the minutiae of FIG. 6 adjusted relative to the minutiae of FIG. 7 concerning a most appropriate axial candidate (2: (7))

FIG. 13 shows the minutiae [2] to [2] thus adjusted relatively to the filed fingerprint F, wherein six pairs will be listed in the pair list for counting the matching value SC afterwards in the detailed matching, the minutia [2] being overlapped by the minutia (7).

As heretofore described, correspondence between a minutia of a searching stripe pattern and a minutia of the filed stripe pattern can be evaluated by comparing their distances, directions or relations to their each neighboring minutiae. Therefore, even when either or both of absolute direction and position, such as orientation of the fingertip and the core position of the fingerprint, cannot be specified, candidate pairs can be listed by selecting possibly corresponding two minutiae without needing to estimate the absolute direction and the position of the searching stripe pattern, in the invention.

Further, the most appropriate rotation angle and the most appropriate shifting coordinates to be applied for adjusting the minutiae of the searching stripe pattern to those of the filed stripe pattern can be obtained in the invention by selecting a most appropriate axial candidate giving the most concentrated coordinate deviations as the coordinate adjustment reference among the candidate pairs, referring to deviation distributions calculated by applying each axial candidate as the coordinate adjustment reference. Therefore, the most appropriate coordinate adjustment of the searching stripe pattern can be performed without needing any troublesome manual works of the expert for positioning and directioning the searching stripe pattern.

Still further, by beforehand preparing a certain number of data sets of rotated coordinates and rotated directions of minutiae of the searching stripe pattern, temporary rotated data set can be easily obtained by referring thereto for each axial candidate applied as the coordinate adjustment reference, when concentration of the deviation distribution is checked. Therefore, the most appropriate axial candidate can be determined with a high speed, in the invention.

Heretofore, present invention is described in connection with some embodiments. However, the scope of the invention is not limited within the embodiments. For example, reinforcement of the correspondence value described referring to FIG. 5 may be also applied when listing up the candidate pairs at step 33 of FIG. 3 or FIG. 4. Further, the detailed matching may be performed concerning two or more sets of adjusted minutiae making use of the most and next or more appropriate axial candidates, for obtaining a highest matching value SC among them.

What is claimed is:

1. A stripe pattern matching system for verifying matching of a searching stripe pattern to a filed stripe pattern of a plurality of filed stripe patterns beforehand registered; said stripe pattern matching system comprising:

a feature extraction means for extracting features of minutiae from the searching stripe pattern;

a searching stripe pattern feature memory for storing the features extracted by the feature extraction means;

a filed stripe pattern feature memory wherein prepared features of minutiae of the plurality of filed stripe patterns;

a pairing examination means for evaluating a correspondence value between a minutia of the searching stripe pattern stored in the searching stripe pattern feature memory and a minutia of the filed stripe pattern prepared in the filed stripe pattern feature memory;

a candidate pair list wherein candidate pairs are registered, each of said candidate pairs being a pair of a minutia of the searching stripe pattern and a minutia of the filed stripe pattern which are decided to be similar with each other by the pairing examination means evaluating the correspondence value between them;

a coordinate conversion means for calculating rotated coordinates of each of minutiae of the searching stripe pattern by rotating coordinates of said each of minutiae by a rotation angle designated around a designated point of an X-Y plane wherewith the coordinates of said each of minutiae are defined;

a rotated stripe pattern feature memory for storing the rotated coordinates of each of minutiae of the searching stripe pattern calculated by the coordinate conversion means to be accessed with each value of the rotation angle;

a deviation plane memory for accumulating the correspondence value of each of the candidate pairs satisfying a nomination condition at an address thereof indicated by deviation coordinates of said each of the candidate pairs, the deviation coordinates being differences between the rotated coordinates of a minutia of the searching stripe pattern and coordinates of a minutia of the filed stripe pattern of said each of the candidate pairs; and a control means for, selecting axial candidates among the candidate pairs, obtaining concentrated deviation coordinates giving a largest accumulation of the correspondence value for each of the axial candidates by controlling the deviation plane memory to accumulate the correspondence value of each of the candidate pairs satisfying the nomination condition according to the deviation coordinates obtained from the rotated coordinates calculated by the coordinate conversion means with the rotation angle equivalent to a direction difference between two minutiae of said each of the axial candidates, finding a most appropriate axial candidate which gives a maximum value of the largest accumulation among the axial candidates, determining the direction difference and the concentrated deviation coordinates given by the most appropriate axial candidate as a most appropriate rotation angle and most appropriate shifting coordinates of the searching stripe pattern, respectively, and performing a detailed matching of the searching stripe pattern to the filed stripe pattern making use of the most appropriate rotation angle and the most appropriate shifting coordinates.

2. The stripe pattern matching system recited in claim 1, wherein;

said control means controls the coordinate conversion means to calculate the rotated coordinates each time by designating the direction difference of each of the axial candidates as the rotation angle for obtaining the concentrated deviation coordinates giving the largest accumulation for said each of the axial candidates by way of the deviation plane memory.

3. The stripe pattern matching system recited in claim 1, wherein;

said control means controls the coordinate conversion means to calculate a certain number of data sets of the rotated coordinates of each of minutiae of the searching stripe pattern sequentially, each of said certain number of data sets being calculated with a rotation angle different by a fixed degree with each other around a fixed point; and said control means controls the deviation plane memory, for obtaining the concentrated deviation coordinates giving the largest accumulation for each of the axial candidates, to accumulate the correspondence value according to the deviation coordinates obtained from the rotated coordinates read out from the rotated stripe pattern feature memory accessed with the rotation angle equivalent to the direction difference of said each of the axial candidates.

4. The stripe pattern matching system recited in claim 1, wherein the correspondence value between a first minutia and a second minutia is defined according a number of cases where a relation of the first minutia has a difference within a first threshold value to a corresponding relation of the second minutia:

the relation of the first minutia being a number of ridge lines between the first minutia and one of four child minutiae of the first minutia, each of the four child minutiae of the first minutia being a nearest minutia of the first minutia in each of four quadrants of a first local x-y plane having its origin at a position of the first minutia and its y-axis directed to a direction of the first minutia; and the corresponding relation of the second minutia being a number of ridge lines between the second minutia and a corresponding child minutia of the second minutia, the corresponding child minutia of the second minutia being a nearest minutia in a corresponding quadrant of a second local x-y plane having its origin at a position of the second minutia and its y-axis directed to a direction of the second minutia.

5. The stripe pattern matching system recited in claim 4, wherein the correspondence value between the first minutia and the second minutia is revised considering correspondence values of the four child minutiae of the first minutia, each calculated between the corresponding child minutia of the second minutia.

6. The stripe pattern matching system recited in claim 1, wherein the pairing examination means evaluate the correspondence value on condition that a direction difference between the minutia of the searching stripe pattern and the minutia of the filed stripe pattern is not more than a second threshold value.

7. The stripe pattern matching system recited in claim 1, wherein the axial candidates are pairs selected among the candidate pairs, each having the correspondence value not smaller than a third threshold value.

8. The stripe pattern matching system recited in claim 1, wherein the axial candidates are a certain number of pairs selected among the candidate pairs, each having the correspondence value not smaller than the correspondence value of any of the others of the candidate pairs.

9. The stripe pattern matching system recited in claim 1, wherein:

the coordinate conversion means further calculates a rotated direction of each of minutiae of the searching stripe pattern by rotating a direction of said each of minutiae by the rotation angle designated; and the nomination condition being that a difference between the rotated direction of a minutia of the searching stripe pattern and a direction of a minutia of the filed stripe pattern of said each of the candidate pairs is not larger than a fourth threshold value, and each of differences between the deviation coordinates of said each of the candidate pairs and the deviation coordinates of said each of the axial candidates is not larger than a fifth threshold value.

10. The stripe pattern matching system recited in claim 1, wherein:

the control means performs the detailed matching further making use of at least one set of the direction difference and the concentrated deviation, each of said at least one set concerning appropriate each of the axial candidates other than the most appropriate axial candidate.

* * * * *